(12) United States Patent
Zheng et al.

(10) Patent No.: US 11,483,828 B2
(45) Date of Patent: Oct. 25, 2022

(54) INDICATION INFORMATION TRANSMISSION METHOD AND APPARATUS

(71) Applicant: HUAWEI TECHNOLOGIES CO., LTD., Shenzhen (CN)

(72) Inventors: Juan Zheng, Beijing (CN); Lei Guan, Beijing (CN); Yuan Li, Bonn (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 16/925,699

(22) Filed: Jul. 10, 2020

(65) Prior Publication Data

US 2020/0344759 A1 Oct. 29, 2020

Related U.S. Application Data

(63) Continuation of application No. PCT/CN2018/125651, filed on Dec. 29, 2018.

(30) Foreign Application Priority Data

Jan. 12, 2018 (CN) .......................... 201810032164.0

(51) Int. Cl.
*H04W 72/04* (2009.01)
*H04L 5/00* (2006.01)
*H04W 48/08* (2009.01)

(52) U.S. Cl.
CPC ....... *H04W 72/0453* (2013.01); *H04L 5/0007* (2013.01); *H04L 5/0092* (2013.01);
(Continued)

(58) Field of Classification Search
CPC ......... H04W 74/0808; H04W 72/0453; H04W 72/0406; H04W 72/0446; H04W 74/0816;
(Continued)

(56) References Cited

U.S. PATENT DOCUMENTS

2017/0041947 A1* 2/2017 Kim .................. H04W 72/0446
2017/0302410 A1 10/2017 Liu et al.
2019/0200351 A1* 6/2019 Sun ....................... H04L 5/0057

FOREIGN PATENT DOCUMENTS

CN 106301738 A 1/2017
CN 106685614 A 5/2017
(Continued)

OTHER PUBLICATIONS

European Search Report issued in corresponding European Patent Application No. 18899693.8, dated Dec. 11, 2020, pp. 1-8, European Patent Office, Munich, Germany.
(Continued)

*Primary Examiner* — Maharishi V Khirodhar
*Assistant Examiner* — Kenneth P Hunt
(74) *Attorney, Agent, or Firm* — Hauptman Ham, LLP

(57) ABSTRACT

A device includes a processor and a non-transitory computer-readable storage medium coupled to the processor. The non-transitory computer-readable storage medium has programming instructions for being executed by the processor. The programming instructions, when executed by the processor, cause the device to receive configuration information sent by an access network side communications apparatus. The configuration information includes identification information of at least one cell. The device is also caused to detect first indication information sent by the access network side communications apparatus by using a length of a first time as a granularity. The first indication information indicates a transmission structure corresponding to one or more time units included in a second time of the at least one cell identified by the identification information. The length of the first time is different from a length of the second time.

17 Claims, 12 Drawing Sheets

(52) U.S. Cl.
    CPC ........... *H04L 5/0094* (2013.01); *H04W 48/08* (2013.01); *H04W 72/0406* (2013.01)

(58) Field of Classification Search
    CPC .... H04W 16/14; H04L 5/0091; H04L 5/0007; H04L 5/0092
    See application file for complete search history.

(56) References Cited

FOREIGN PATENT DOCUMENTS

| | | | |
|---|---|---|---|
| CN | 107026689 A | 8/2017 | |
| CN | 107135461 A | 9/2017 | |
| EP | 3399683 A1 | 11/2018 | |
| WO | 2017133005 A1 | 8/2017 | |

OTHER PUBLICATIONS

3GPP TSG RAN Meeting #75,RP-170828:"New SID on NR-based Access to Unlicensed Spectrum".Qualcomm, Dubrovnik, Croatia, Mar. 6-9, 2017,total 5 pages.

International search report dated Mar. 18, 2019 from corresponding application No. PCT/CN2018/125651.

\* cited by examiner

INDICATION INFORMATION TRANSMISSION METHOD AND APPARATUS

CROSS-REFERENCE TO RELATED DISCLOSURES

This application is a continuation of International Application No. PCT/CN2018/125651, filed on Dec. 29, 2018, which claims priority to Chinese Patent Application No. 201810032164.0, filed on Jan. 12, 2018. The disclosures of the aforementioned applications are hereby incorporated by reference in their entireties.

TECHNICAL FIELD

Embodiments of this disclosure relate to the communications field, and more specifically, to an indication information transmission method and apparatus.

BACKGROUND

In a wireless communications network, devices need to transmit information by using a frequency resource. The frequency resource is also referred to as a spectrum or a frequency band. The frequency band may include an authorized frequency band and an unauthorized frequency band. The unauthorized frequency band is also referred to as a license-exempt frequency band. The authorized frequency band is a frequency resource dedicated to some operators. The license-exempt frequency band is a public frequency resource in the wireless communications network, and may be used for free. Different devices may share the frequency resource on the license-exempt frequency band. With the development of communications technologies, an increasing amount of information is transmitted in the wireless communications network. Transmitting information by using the license-exempt frequency band may improve a data throughput in the wireless communications network and better meet user requirements.

In a future communications system such as a 5th generation (5G) communications system, a new radio (NR)-based communications system may perform data communication by using a resource of the license-exempt frequency band or a resource of a licensed frequency band. In a data communications system, how to indicate a transmission structure of uplink/downlink data is a problem that needs to be resolved in this disclosure.

SUMMARY

Embodiments of this disclosure provide an indication information transmission method and apparatus.

According to a first aspect, an embodiment of this disclosure provides an indication information transmission method, including: receiving, by a terminal side communications apparatus, configuration information sent by an access network side communications apparatus, where the configuration information includes identification information of at least one cell; and detecting, by the terminal side communications apparatus by using a length of a first time as a granularity, first indication information sent by the access network side communications apparatus, where the first indication information is used to indicate a transmission structure corresponding to one or more time units included in a second time of the at least one cell identified by the identification information, and the length of the first time is different from a length of the second time. According to the method provided in this embodiment of this disclosure, a detection period of the indication information is decoupled from a time range indicated by the indication information, and a more flexible sending location of the indication information is more suitable for data transmission of a system on a license-exempt frequency band or a system on a licensed frequency band.

In a possible implementation, the detecting, by the terminal side communications apparatus by using a length of a first time as a granularity, first indication information sent by the access network side communications apparatus includes: when determining that the at least one cell does not obtain a resource of the license-exempt frequency band through contention, detecting, by the terminal side communications apparatus by using the length of the first time as the granularity, the first indication information sent by the access network side communications apparatus. According to the method provided in this embodiment of this disclosure, a detection granularity of the indication information is relatively fine, thereby supporting faster resource occupation for data transmission.

Optionally, after the detecting, by the terminal side communications apparatus by using a length of a first time as a granularity, first indication information sent by the access network side communications apparatus, the method further includes: detecting, by the terminal side communications apparatus within the second time by using a length of a third time as a granularity, second indication information sent by the access network side communications apparatus, where the second indication information is used to indicate a transmission structure corresponding to one or more time units included in a fourth time of the at least one cell identified by the identification information, and the fourth time is not exactly the same as the second time.

In a possible implementation, the terminal side communications apparatus receives configuration information that is of the transmission structure and that is sent by the access network side communications apparatus, where the configuration information of the transmission structure includes M time units and a transmission structure corresponding to each time unit; the first indication information includes an indication of an $i^{th}$ time unit in the M time units; and the terminal side communications apparatus determines, based on the configuration information of the transmission structure and the indication that is of the $i^{th}$ time unit and that is included in the first indication information, a transmission structure corresponding to the one or more time units included in the second time, where the second time includes (M−i+1) time units, a transmission structure corresponding to a $j^{th}$ time unit in the (M−i+1) time units is a transmission structure corresponding to an $(i+j−1)^{th}$ time unit in the M time units included in the configuration information of the transmission structure, where $1 \leq i \leq M$, $1 \leq j \leq M-i+1$, and i and j are natural numbers. According to the method provided in this embodiment of this disclosure, the indication information may be repeatedly sent within an indicated transmission time range. Correspondingly, a slot structure configuration and interpretation method for repeatedly transmitting the indication information is adapted, so that configuration of a slot structure within the time range indicated by the indication information is simplified, and reliability of data transmission is improved.

In a possible implementation, the terminal side communications apparatus receives, in an unknown state part and/or a downlink state part of the at least one time unit included in the second time, control information sent by the access network side communications apparatus, where the control information is control information common to a cell and/or control information specific to the terminal side communications apparatus. According to the method provided in this embodiment of this disclosure, a terminal device may continue to detect, in the unknown state part and/or the downlink state part, control information sent by an access network device, so that data transmission of the system on the license-exempt frequency band or the system on the licensed frequency band may be more flexibly adapted.

Optionally, the length of the first time is less than duration of one slot. According to the method provided in this embodiment of this disclosure, a finer detection granularity of the indication information may support faster resource occupation for data transmission or faster adjustment of a transmission structure of data.

In a possible implementation, a transmission structure corresponding to a first orthogonal frequency division multiplexing OFDM symbol included in the at least one of one or more time units included in the second time of the at least one cell is in an unknown state. According to the method provided in this embodiment of this disclosure, standard implementation complexity may be simplified.

According to a second aspect, an embodiment of this disclosure provides an indication information transmission method, including: sending, by an access network side communications apparatus, configuration information to a terminal side communications apparatus, where the configuration information includes identification information of at least one cell; and sending, by the access network side communications apparatus, first indication information to the terminal side communications apparatus, where the first indication information is used to indicate a transmission structure corresponding to one or more time units included in a second time of the at least one cell identified by the identification information. According to the method provided in this embodiment of this disclosure, a detection period of the indication information is decoupled from a time range indicated by the indication information, and a more flexible sending location of the indication information is more suitable for data transmission of a system on a license-exempt frequency band or a system on a licensed frequency band.

Optionally, the second time includes at least one time unit in which a result of clear channel assessment is idle, and/or the second time includes at least one time unit associated with a channel listening mechanism without random backoff. According to the method provided in this embodiment of this disclosure, opportunistic data transmission of a system on a license-exempt frequency band is more adapted.

In a possible implementation, after the sending, by the access network side communications apparatus, first indication information to the terminal side communications apparatus, the method further includes: sending, by the access network side communications apparatus, second indication information within the second time by using a length of a third time as a granularity, where the second indication information is used to indicate a transmission structure corresponding to one or more time units included in a fourth time of the at least one cell identified by the identification information, and the fourth time is not exactly the same as the second time.

In a possible implementation, the access network side communications apparatus sends configuration information of the transmission structure to the terminal side communications apparatus, where the configuration information of the transmission structure includes M time units and a transmission structure corresponding to each time unit; the first indication information includes an indication of an $i^{th}$ time unit in the M time units; and the second time includes (M−i+1) time units, a transmission structure corresponding to a $j^{th}$ time unit in the (M−i+1) time units is a transmission structure corresponding to an $(i+j−1)^{th}$ time unit in the M time units included in the configuration information of the transmission structure, where 1≤i≤M, 1≤j≤M−i+1, and i and j are natural numbers.

In a possible implementation, the access network side communications apparatus sends control information to the terminal side communications apparatus in an unknown state part and/or a downlink state part of the at least one time unit included in the second time, where the control information is control information common to a cell and/or control information specific to the terminal side communications apparatus.

Optionally, a length of a time unit in which the first indication information is located is less than a length of one slot.

In a possible implementation, a transmission structure corresponding to a first orthogonal frequency division multiplexing OFDM symbol included in the at least one of one or more time units included in the second time of the at least one cell is in an unknown state.

According to a third aspect, an embodiment of this disclosure provides an indication information transmission method, including: sending, by an access network side communications apparatus, configuration information to a terminal side communications apparatus, where the configuration information includes identification information of at least one cell; and sending, by the access network side communications apparatus, first indication information to the terminal side communications apparatus by using a length of a first time as a granularity, where the first indication information is used to indicate a transmission structure corresponding to one or more time units included in a second time of the at least one cell identified by the identification information, and the length of the first time is different from a length of the second time.

In a possible implementation, after the sending, by the access network side communications apparatus, first indication information to the terminal side communications apparatus, the method further includes: sending, by the access network side communications apparatus, second indication information within the second time by using a length of a third time as a granularity, where the second indication information is used to indicate a transmission structure corresponding to one or more time units included in a fourth time of the at least one cell identified by the identification information, and the fourth time is not exactly the same as the second time.

In a possible implementation, the access network side communications apparatus sends configuration information of the transmission structure to the terminal side communications apparatus, where the configuration information of the transmission structure includes M time units and a transmission structure corresponding to each time unit; the first indication information includes an indication of an $i^{th}$ time unit in the M time units; and the second time includes (M−i+1) time units, a transmission structure corresponding to a $j^{th}$ time unit in the (M−i+1) time units is a transmission structure corresponding to an $(i+j−1)^{th}$ time unit in the M time units included in the configuration information of the transmission structure, where 1≤i≤M, 1≤j≤M−i+1, and i and j are natural numbers.

In a possible implementation, the access network side communications apparatus sends control information in an unknown state part and/or a downlink state part of the at least one time unit included in the second time, where the control information is control information common to a cell and/or control information specific to the terminal side communications apparatus.

Optionally, the length of the first time is less than duration of one slot.

In a possible implementation, a transmission structure corresponding to a first orthogonal frequency division multiplexing OFDM symbol included in the at least one of one or more time units included in the second time of the at least one cell is in an unknown state.

According to a fourth aspect, an embodiment of this disclosure provides a terminal side communications apparatus, configured to perform the method according to the first aspect. Specifically, the terminal side communications apparatus includes units configured to perform the method according to any one of the first aspect or the implementations of the first aspect.

According to a fifth aspect, an embodiment of this disclosure provides an access network side communications apparatus, configured to perform the method according to the second aspect. Specifically, the access network side communications apparatus includes units configured to perform the method according to any one of the second aspect or the implementations of the second aspect.

According to a sixth aspect, an embodiment of this disclosure provides an access network side communications apparatus, configured to perform the method according to the third aspect. Specifically, the access network side communications apparatus includes units configured to perform the method according to any one of the third aspect or the implementations of the third aspect.

According to a seventh aspect, this disclosure provides a computer storage medium, storing a computer program (instruction), and when the program (the instruction) is run on a computer, the computer is enabled to perform the method according to the first aspect, the second aspect, or the third aspect.

According to an eighth aspect, this disclosure provides a chip system. The chip system includes a processor, configured to support an access network side communications apparatus and a terminal side communications apparatus in implementing a function according to the foregoing aspects, for example, generating or processing data and/or information in the foregoing methods. In a possible design, the chip system further includes a memory. The memory is configured to store a program instruction and data necessary to the access network side communications apparatus and the terminal side communications apparatus. The chip system may include a chip, or may include a chip and another discrete device.

According to a ninth aspect, this disclosure provides a communications apparatus, including a processor and a memory. The memory is configured to store a computer execution instruction, and the processor is configured to implement the computer execution instruction stored in the memory, to enable the communications apparatus to perform the method according to the first aspect, the second aspect, or the third aspect.

According to a tenth aspect, this disclosure provides a communications system, including the terminal side communications apparatus according to the fourth aspect and the access network side communications apparatus according to the fifth aspect.

According to an eleventh aspect, this disclosure provides a communications system, including the terminal side communications apparatus according to the fourth aspect and the access network side communications apparatus according to the sixth aspect.

According to the methods provided in the embodiments of this disclosure, a transmission structure of uplink/downlink data may be better indicated, a method for designing a control channel may be inherited to a maximum extent, and standard implementation complexity may be simplified.

DESCRIPTION OF EMBODIMENTS

The following describes the technical solutions in the embodiments of this disclosure with reference to the accompanying drawings in the embodiments of this disclosure. It should be noted that the technical solutions and features in the embodiments of this disclosure may be mutually combined when there is no conflict.

In the embodiments of this disclosure, "a/an" means a single individual, and does not indicate that "a/an" can only be one individual and cannot be applied to another individual. For example, in the embodiments of this disclosure, "a terminal device" refers to a particular terminal device, and this does not mean that "a terminal device" can be applied only to one particular terminal device. The terms "system" and "network" may be used interchangeably in this disclosure.

A reference to "an embodiment" (or "an implementation") or "embodiments" (or "implementations") in this disclosure means that a specific feature, a structure, a characteristic, and the like that are described with the embodiments are included in at least one embodiment. Therefore, "in an embodiment" or "in the embodiments" that appears throughout this specification does not represent a same embodiment.

Further, in the embodiments of this disclosure, the terms "and/or" and "at least one" used in cases of "A and/or B" and "at least one of A and B" include any one of three scenarios: a scenario in which A is included but B is excluded, a scenario in which B is included but A is excluded, and a scenario in which both options A and B are included. For another example, in cases of "A, B, and/or C" and "at least one of A, B, and/or C", such phrases include any one of seven scenarios: a scenario in which A is included but both B and C are excluded, a scenario in which B is included but both A and C are excluded, a scenario in which C is included but both A and B are excluded, a scenario in which both A and B are included but C is excluded, a scenario in which both B and C are included but A is excluded, a scenario in which both A and C are included but B is excluded, and a scenario in which three options A, B, and C are included. As easily understood by a person of ordinary skill in the art and a related art, in the embodiments of this disclosure, all other similar descriptions may be understood in the foregoing manner.

Figure 1:
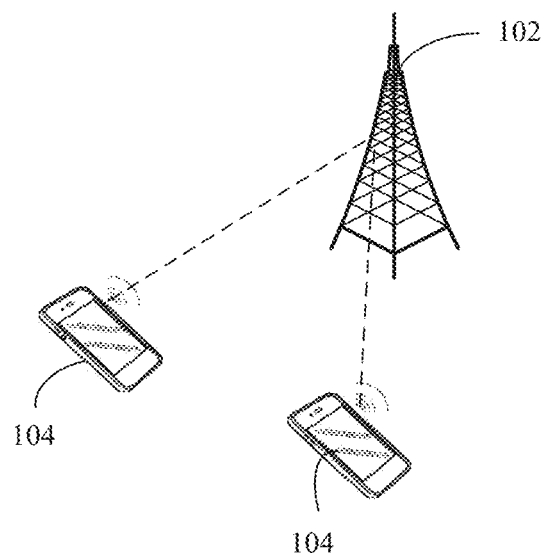
FIG. 1 is a schematic architectural diagram of a wireless communications system according to an embodiment of this disclosure.

FIG. 1 is a schematic diagram of communication between a wireless device and a wireless communications system. The wireless communications system may be a system applied to various radio access technologies (RAT), for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. For example, the wireless communications system may be a long term evolution (LTE) system, the CDMA system, a wideband code division multiple access (WCDMA) system, a global system for mobile communications (GSM), a wireless local area network (WLAN) system, a new radio (NR) system, various evolved or converged systems, and a system using a future communications technology. A system architecture and a service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may know that: With the evolution of the network architecture and the emergence of new service scenarios, the technical solutions provided in the embodiments of this disclosure are also applicable to similar technical problems.

For brevity, FIG. 1 shows communication between one network device 102 (for example, an access network device) and two wireless devices 104 (for example, terminal devices). Usually, the wireless communications system may include any quantity of network devices and terminal devices. The wireless communications system may further include one or more core network devices, a device configured to bear a virtualized network function, or the like. The access network device 102 may provide services for the wireless devices by using one or more carriers. In this disclosure, the access network device and the terminal devices are further collectively referred to as wireless apparatuses.

In this disclosure, the access network device 102 is an apparatus that is deployed in a radio access network and that is configured to provide a wireless communication function for the terminal devices. The access network device may include a macro base station (BS), a micro base station (also referred to as a small cell), a relay node, an access point, or the like in various forms. In systems that use different radio access technologies, names of a device having a radio access function may be different. For example, in the LTE system, the device is referred to as an evolved NodeB (eNB or eNodeB); and in a third generation (3G) system, the device is referred to as a NodeB, and the like. For ease of description, in this disclosure, the device is briefly referred to as the access network device, and is sometimes referred to as a base station.

The wireless device in the embodiments of this disclosure may include various handheld devices, vehicle-mounted devices, wearable devices, or computing devices that have a wireless communication function, or other processing devices connected to a wireless modem. The wireless device may be referred to as a terminal device, or may be referred to as a mobile station (MS), a terminal, user equipment (UE), and the like. The wireless device may include a subscriber unit, a cellular phone, a smartphone, a wireless data card, a personal digital assistant (PDA) computer, a tablet computer, a modem or a modem processor, a handheld device, a laptop computer, a netbook, a cordless phone or a wireless local loop (WLL) station, a Bluetooth device, a machine type communication (MTC) terminal, and the like. For ease of description, the devices are simply referred to as a terminal device or the UE in this disclosure.

The wireless device may support one or more wireless technologies used for wireless communication, for example, 5G, LTE, WCDMA, CDMA, 1X, time division-synchronous code division multiple access (TS-SCDMA), GSM, and 802.11. The wireless device may also support a carrier aggregation technology.

A plurality of wireless devices may perform a same service or different services, for example, a mobile broadband service, an enhanced mobile broadband (eMBB) service, and an ultra-reliable and low-latency communication (URLLC) service configured by a terminal.

Figure 2:
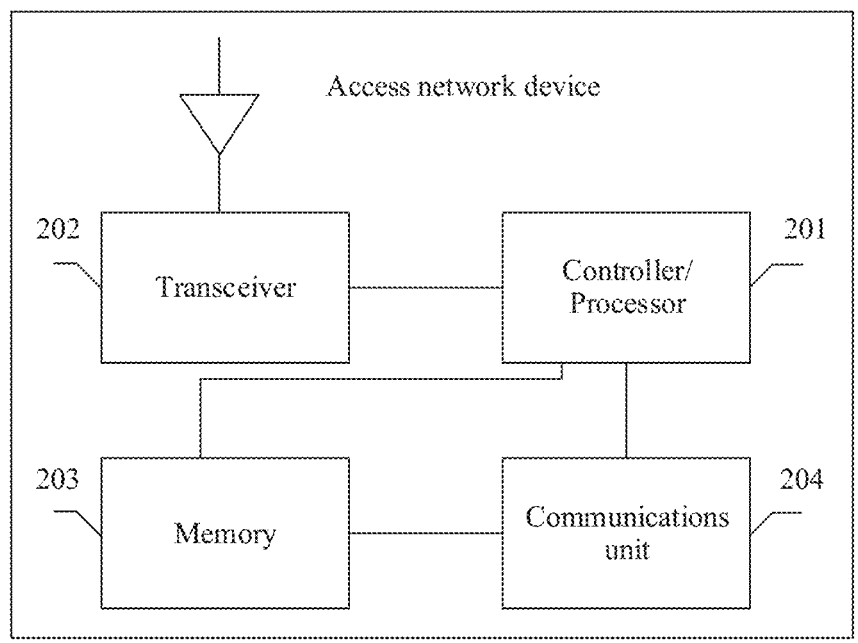
FIG. 2 is a schematic structural diagram of an access network device according to an embodiment of this disclosure.

Further, a possible schematic structural diagram of the access network device 102 may be shown in FIG. 2. The access network device 102 can perform a method provided in the embodiments of this disclosure. The access network device 102 may include a controller or a processor 201 (the processor 201 is used as an example below for description) and a transceiver 202. The controller/processor 201 is sometimes also referred to as a modem processor. The modem processor 201 may include a baseband processor (BBP) (not shown). The baseband processor processes a received digitized signal, to extract information or a data bit conveyed in the signal. Therefore, based on a requirement or an expectation, the BBP is usually implemented in one or more digital signal processors (DSP) in the modem processor 201 or implemented as a separated integrated circuit (IC).

The transceiver 202 may be configured to: support information receiving and sending between the access network device 102 and the terminal devices, and support radio communication between the terminal devices. The processor 201 may further be configured to perform various functions for communication between the terminal devices and another network device. On an uplink, an uplink signal from the terminal devices is received by using an antenna, demodulated by the transceiver 202, and further processed by the processor 201, to restore service data and/or signaling information sent by the terminal devices. On a downlink, service data and/or a signaling message are/is processed by the terminal devices and modulated by the transceiver 202, to generate a downlink signal, and the downlink signal is transmitted to UE by using the antenna. The access network device 102 may further include a memory 203. The memory 203 may be configured to store program code and/or data of the access network device 102. The transceiver 202 may include an independent receiver circuit and an independent transmitter circuit, or maybe a same circuit implementing receiving and sending functions. The access network device 102 may further include a communications unit 204, configured to support communication between the access network device 102 and another network entity, for example, configured to support the access network device 102 in communicating with a network device or the like in a core network.

Optionally, the access network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, and the like. The bus may include an address bus, a data bus, a control bus, and the like.

Figure 3:
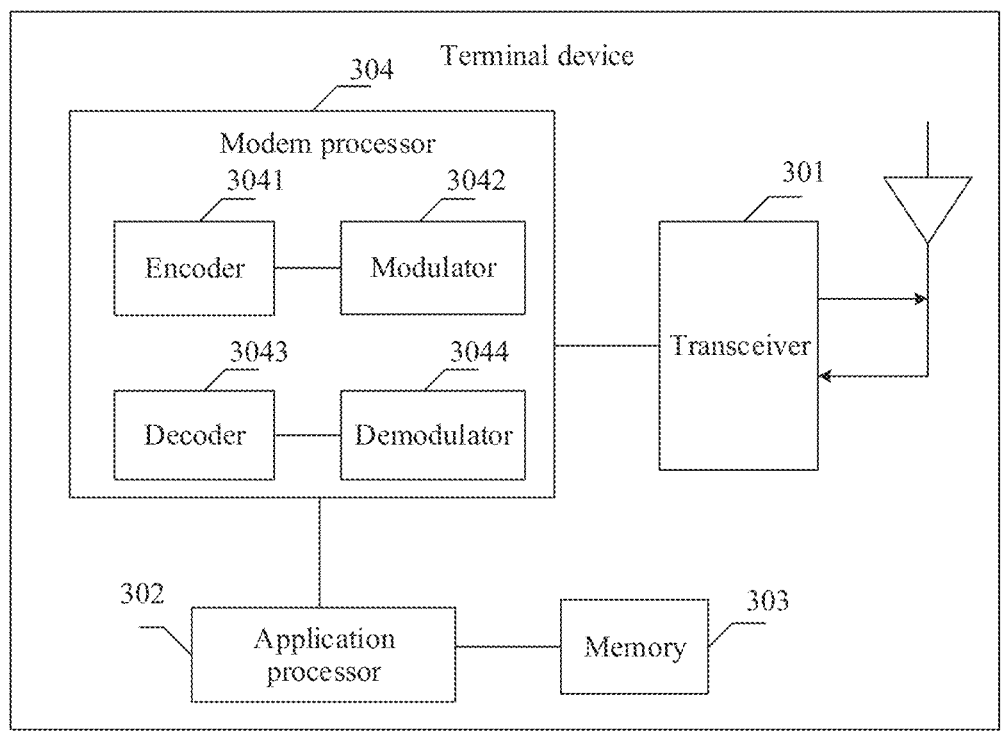
FIG. 3 is a schematic structural diagram of a terminal device according to an embodiment of this disclosure.

FIG. 3 is a possible schematic structural diagram of a terminal device in the foregoing wireless communications system. The terminal device can perform a method provided in the embodiments of this disclosure. The terminal device may be either of the two terminal devices 104. The terminal device includes a transceiver 301, an application processor 302, a memory 303, and a modem processor 304.

The transceiver 301 may adjust (for example, analog convert, filter, amplify, and up-convert) an output sample and generate an uplink signal. The uplink signal is transmitted to the base station in the foregoing embodiments by using an antenna. On a downlink, the antenna receives a downlink signal transmitted by an access network device. The transceiver 301 may adjust (for example, filter, amplify, down-convert, and digitize) a signal received from the antenna and provide an input sample.

The modem processor 304 is sometimes also referred to as a controller or a processor, and may include a baseband processor (BBP) (not shown). The baseband processor processes a received digitized signal, to extract information or a data bit conveyed in the signal. Based on a requirement or an expectation, the BBP is usually implemented in one or more digits in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent on the uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. The units perform processing based on a radio access technology used in a radio access network.

The modem processor 304 receives, from the application processor 302, digital data that may indicate voice, data, or control information, and processes the digital data for transmission. The modem processor may support one or more of a plurality of wireless communications protocols of a plurality of communications systems, for example, LTE, new radio, a universal mobile telecommunications system (UMTS), and high speed packet access (HSPA). Optionally, the modem processor 304 may also include one or more memories.

Optionally, the modem processor 304 and the application processor 302 may be integrated into one chip of the processor.

The memory 303 is configured to store program code (sometimes also referred to as a program, an instruction, software, or the like) and/or data used to support communication of the terminal device.

It should be noted that the memory 203 or the memory 303 may include one or more storage units, for example, may be a storage unit that is inside the processor 201, the modem processor 304, or the application processor 302 and that is configured to store program code, or may be an external storage unit independent of the processor 201, the modem processor 304, or the application processor 302, or may be a component including a storage unit that is inside the processor 201, the modem processor 304, or the application processor 302, and an external storage unit independent of the processor 201, the modem processor 304, or the application processor 302.

The processor 201 and the modem processor 301 may be processors of a same type, or may be processors of different types. For example, the processor 201 and the modem processor 301 may be implemented in a central processing unit (CPU), a general-purpose processor, a digital signal processor (DSP), an application-specific integrated circuit (ASIC), a field programmable gate array (FPGA), another programmable logic device, a transistor logic device, a hardware component, another integrated circuit, or any combination thereof. The processor 201 and the modem processor 301 may implement or execute various example logical blocks, modules, and circuits described with reference to content disclosed in the embodiments of this disclosure. Alternatively, the processor may be a combination of components implementing a computing function, for example, a combination of one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this disclosure may be implemented as electronic hardware, an instruction that is stored in a memory or another computer-readable medium and that is executed by a processor or another processing device, or a combination thereof. As an example, the devices described in this specification may be applied to any circuit, hardware component, IC, or a chip of the IC. The memory disclosed in this disclosure may be any type of memory in any size, and may be configured to store any type of required information. To clearly explain such interchangeability, various explanatory components, blocks, modules, circuits, and steps have been generally described above based on functionality of the components, blocks, modules, circuits, and step. How to implement such functionality depends on a specific application, a design selection, and/or a design constraint that is imposed on an entire system. A person skilled in the art may use different manners to implement the described functionality for each particular application, but it should not be considered that such implementation goes beyond the scope of this disclosure.

In the schematic architectural diagram of the wireless communications system shown in FIG. 1, a wireless access network device such as a base station and various transmission reception points (TRP) such as an access point of a wireless local area network provide an access service in a licensed frequency band or an access service in a license-exempt frequency band for the terminal device. An operator may implement network capacity offloading by using a resource of the license-exempt frequency band, but needs to obey regulatory requirements formulated by different regions and different spectrums for the resource of the license-exempt frequency band. For example, a target license-exempt frequency band is a 5 GHz license-exempt frequency band opened by the government of each country. Coexistence specifications of the target license-exempt frequency band include transmit power control (TPC), dynamic frequency selection (DFS), channel occupied bandwidth, listen before talk (LBT), and the like. Usually, listen before talk LBT is an inter-system coexistence policy, and a wireless communications system needs to use an LBT rule when the license-exempt frequency band is occupied for communication. The following specifically describes the LBT rule in detail.

A wireless fidelity (Wi-Fi) communications system that may currently work on the license-exempt frequency band is used as an example. A resource contention method applied in the Wi-Fi communications system is the LBT rule. A basic idea of the LBT rule is that: Before sending data on a channel, each communications device needs to first detect whether a current channel is idle, that is, whether it may be detected that a nearby node is occupying the channel to send data. The detection process is referred to as clear channel assessment (CCA). If detecting that the channel is occupied, the communications device cannot transmit the data on the channel currently. Otherwise, if detecting that the channel is idle within a period of time, the communications device may send the data. In general, to keep friendly coexistence with another communications device, a time for sending the data on the channel is limited. Within a range of the limited time, the communications device does not need to perform clear assessment on the channel. Alternatively, within a range of the limited time, the communications device may further share a resource that is of the license-exempt frequency band and that is obtained through contention with the another communications device. Specifically, another communications device that has a relationship with the communications device may use, in a high priority, the resource of the license-exempt frequency band. Herein, the another communications device that has a relationship with the communications device may be understood as another communications device serving the communications device. For example, assuming that the communications device is a base station, the another communications device serving the communications device may be understood as a terminal device serving the base station. Alternatively, if the communications device is the terminal device, the another communications device that has a relationship with the communications device may be understood as a serving base station of the terminal device, or another user equipment served by a serving base station of the terminal device. Second, that the resource of the license-exempt frequency band is used in the high priority herein may include that the another communications device may not need to perform clear assessment on the channel when using the resource of the license-exempt frequency band within the foregoing range of the limited time, or may perform listening in a manner of CCA with a high priority if clear assessment is required. For example, a one shot listening mechanism without a random backoff mechanism may be used.

For ease of description, in this disclosure, the range of the limited time may be referred to as a maximum channel occupancy time (MCOT). A specific value of the MCOT is related to regulations of different places, or is related to a standard definition. For example, in a 5 GHz frequency band, according to Japanese regulations, the MCOT may be 4 ms; according to European regulations, the MCOT may be 13 ms or 10 ms; and according to a 3rd generation partner project (3GPP) standard protocol, a specific value of the MCOT is related to a priority of the LBT, and the specific value may be 2 ms, 4 ms, 6 ms, 8 ms, or 10 ms. In a 60 GHz frequency band, according to the European regulations, the MCOT may be 9 ms.

In the foregoing process, whether the channel is idle may be detected in a manner such as signal detection, energy detection, or the like. Specifically, if whether the channel is idle is detected through signal detection, correspondingly, if no specific signal (for example, for a Wi-Fi system, the specific signal may be a preamble preamble) is obtained through contention, it may be considered that the channel is idle. In this case, a detection device may perform data transmission by using the license-exempt frequency band. If energy detection is used to detect whether the channel is idle, if received or detected energy is less than a threshold, it may also be considered that the channel is idle. Similarly, in this case, the detection device may perform data transmission by using the license-exempt frequency band.

In a region with an LBT constraint, before performing data transmission by using the license-exempt frequency band, a device that requires to use the license-exempt frequency band needs to first detect whether the channel is idle. To be specific, data transmission on the license-exempt frequency band is opportunistic. In a current NR communications system, higher layer signaling is supported to indicate a transmission structure of uplink/downlink data on the license-exempt frequency band. The higher layer signaling herein includes broadcast signaling or radio resource control (RRC) signaling UE specific. For example, in NR, the transmission structure of the uplink/downlink data may be semi-statically configured by using the higher layer signaling (or a higher layer parameter) UL-DL-configuration-common or UL-DL-configuration-dedicated. The semi-static configuration herein indicates that an effective time of the transmission structure that is of the uplink/downlink data and that is configured by the higher layer parameter is usually in an order of magnitude of hundreds of milliseconds.

If the transmission structure of data on the license-exempt frequency band is directly configured in an NR-U system by using the foregoing higher layer signaling, on the one hand, the transmission structure that is of the uplink/downlink data and that is indicated by the higher layer signaling is fixed, and this is not applicable to opportunistic data transmission on the license-exempt frequency band. On the other hand, the effective time of the transmission structure that is of the data and that is configured by using the higher layer signaling is in the order of magnitude of hundreds of milliseconds. However, on the license-exempt frequency band, because of opportunistic transmission, the access network device or the terminal device cannot implement anytime arrival and anytime transmission of the data. Therefore, the foregoing design characteristic is not applicable to the NR-U system.

However, if physical layer information, that is, slot format information (SFI) that indicates the transmission structure of the uplink/downlink data and that is in the NR system is directly applied to the NR-U system, on the one hand, a fixed detection location of the SFI is not applicable to the NR-U system. On the other hand, to preempt a channel more quickly, the access network device in the NR-U system may use a non-slot-based time unit (non-slot) as a basic data scheduling unit. In this case, the SFI is always placed at a start OFDM symbol of a slot, and is not applicable to a data transmission characteristic of NR-U.

Alternatively, if common control information that is used to support an end location of downlink data transmission and a time range of uplink data transmission and that is in a licensed-assisted access (LAA) system is directly used in the NR-U system, it is equivalent to introducing a design of a new physical channel, and complexity of the design and complexity of implementation in a standard are relatively high.

On the other hand, if the transmission structure of the data is directly configured on the licensed frequency band by using the higher layer signaling, because the transmission structure that is of the uplink/downlink data and that is indicated by the higher layer signaling mentioned above is fixed and the effective time of the transmission structure that is of the data and that is configured by using the higher layer signaling is in the order of magnitude of hundreds of milliseconds, the configuration of the transmission structure of the data on the licensed frequency band is inflexible. In addition, in a current NR system, the SFI is used to indicate the transmission structure of the data. It is assumed that transmission duration corresponding to a time period for detecting the SFI by the terminal device is equal to transmission duration corresponding to a time range indicated by the SFI. This is not conducive to flexible adjustment of the configuration of the transmission structure of the data on the licensed frequency band.

Figure 4:
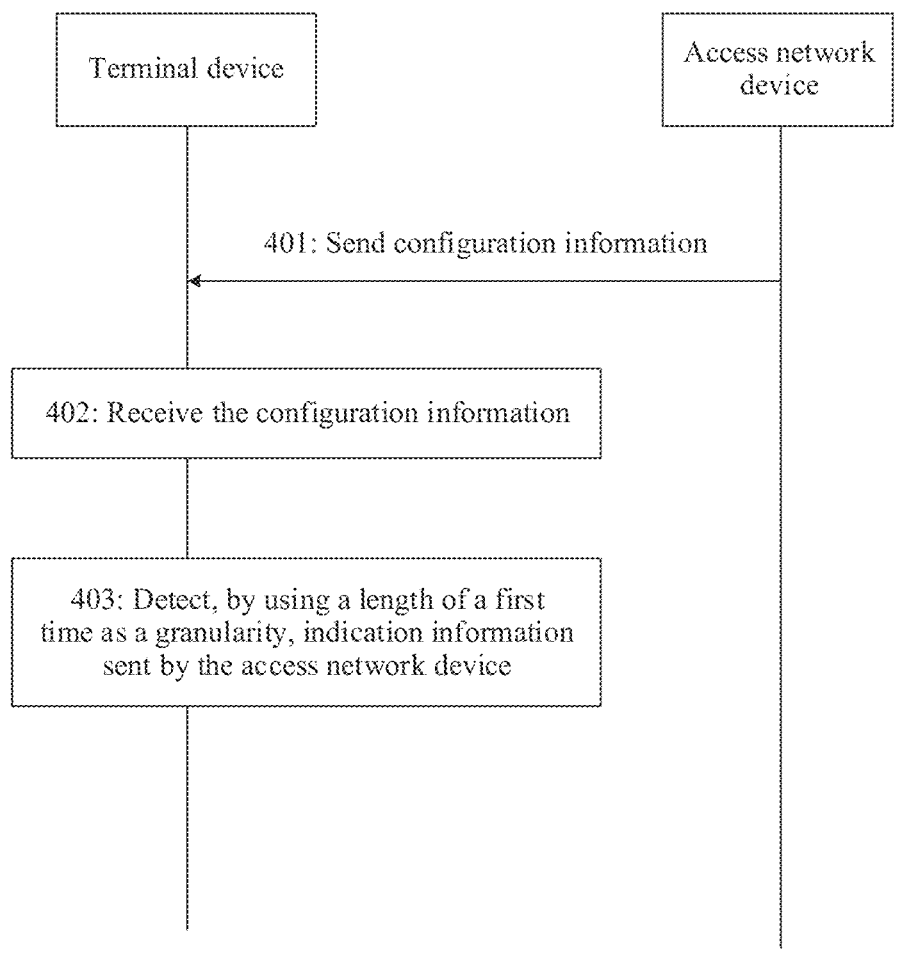
FIG. 4 is a schematic flowchart of an indication information transmission method according to an embodiment of this disclosure.

In view of the foregoing problem, an embodiment of this disclosure provides an indication information transmission method, to indicate a transmission structure of uplink/downlink data of an access network device on a license-exempt frequency band or a licensed frequency band. As shown in FIG. 4, the transmission method may be applied to the network architecture shown in FIG. 1, the access network device in the method may be applied to the schematic structural diagram of FIG. 2, and the terminal device may be applied to the schematic structural diagram of FIG. 3. In the following, the method provided in this embodiment of this disclosure is described by using data transmission on a license-exempt frequency band as an example. The transmission method includes the following steps.

Step 401: The access network device sends configuration information to the terminal device, where the configuration information includes identification information of at least one cell.

Optionally, the configuration information further includes configuration information of a cell set.

Optionally, the access network device sends the configuration information of the cell set of the terminal device to the terminal device, where the cell set includes at least one cell of the terminal device, and the configuration information further includes identification information of the at least one cell. In this embodiment of this disclosure, a cell may also be considered as a carrier. Therefore, the configuration information of the cell set may also be understood as configuration information of a carrier set. Correspondingly, a specific representation form of the identification information of the cell is, for example, identification information of the cell (cell ID) or identification information of the carrier (carrier ID).

Optionally, the configuration information that is of the cell set and that is sent by the access network device to the terminal device may include configuration information that is of a set of bandwidth parts (BWP) and that is sent by the access network device to the terminal device. For example, identification information of the BWP may be identified by using an index of the BWP, or may be represented in another form. This is not specifically limited. One cell may include one or more BWPs. The configuration information that is of the set of BWPs and that is sent by the access network device to the terminal device includes at least one BWP. When the configuration information of the set of BWPs includes a plurality of BWPs, the plurality of BWPs may belong to a same cell (or carrier), or may belong to different cells (or carriers). This is not specifically limited herein. For ease of description, in this embodiment of this disclosure, a cell is used as an example for description.

A cell included in the configuration information that is of the cell set and that is sent by the access network device to the terminal device may be a potential serving cell of the terminal device. To be specific, the terminal device and the access network device may perform data transmission in the cells, including receiving, by the terminal device, downlink data sent by the access network device, and/or sending, by the terminal device, uplink data to the access network device. The potential serving cell herein may be understood as that at a moment, not all cells configured in the configuration information of the cell set are serving cells of the terminal device. For example, the configuration information of the cell set includes M cells. However, limited by a processing capability of the data transmission of the terminal device, the terminal device can perform data transmission and reception with the access network device in only N cells at the same time, where both M and N are positive integers, and N is less than M. However, herein, the access network device configures, for the terminal device, the M cells whose processing capability exceeds that of the terminal device, so that a radio resource management (radio resource management, RRM) measurement process of the terminal device may be simplified. The foregoing is an example description. In this embodiment of this disclosure, there is no direct relationship between a quantity of cells included in the cell set indicated by the configuration information that is of the cell set and that is sent by the access network device and a quantity of cells in which the terminal device may simultaneously process data transmission. To be specific, the quantity of cells in which the terminal device may simultaneously process data transmission may be less than, greater than, or equal to the quantity of cells included in the cell set.

In this embodiment of this disclosure, the access network device may send the configuration information of the cell set to the terminal device in the following manner. Certainly, there may also be another signaling notification manner. This is not specifically limited. It should be noted that in this embodiment of this disclosure, because the configuration information sent by the access network device to the terminal device includes the configuration information of the cell set, that the access network device sends the configuration information of the cell set to the terminal device is equivalent to that the access network device sends the configuration information to the terminal device.

(1) Higher layer signaling. For example, the access network device may send the configuration information of the cell set by using higher layer broadcast signaling or higher layer signaling specific to a user. The higher layer broadcast signaling may include signaling sent by using a broadcast channel, for example, control information included in a synchronization signal block (SSB), control information included in remaining minimum system information (RMSI), control information included in optional system information (OSI), and control information included in on-demand system information. The higher layer signaling specific to the user may include, for example, RRC signaling.

(2) Medium access control (MAC) signaling. The MAC signaling may be sent by using a physical layer data service channel, for example, by using a physical downlink shared channel (PDSCH).

(3) Physical layer signaling. For example, after the terminal device and the access network device establish an RRC link, the access network device may send the configuration information of the cell set by using the physical layer signaling. The physical layer signaling may be physical layer signaling specific to the terminal device, namely, signaling scrambled by using a radio network temporary identifier (RNTI) specific to the terminal device.

(4) A combination of the foregoing signaling. For example, a combination of the higher layer signaling and the physical layer signaling: The access network device first configures the configuration information of the cell set by using the higher layer signaling, where the configuration information of the cell set may include several different groups of cell sets, and then the access network device dynamically indicates, by using the physical layer signaling, a group in which the configuration information of the cell set is effective. Alternatively, in the configuration information that is of the cell set and that is configured by the access network device by using a higher layer, the configuration information of the cell set includes a plurality of cells, and the access network device dynamically indicates, by using the physical layer signaling, one or more cells that are effective. For another example, a combination of the higher layer signaling and the MAC signaling: The access network device configures the configuration information of the cell set by using the higher layer signaling, and then indicates, by using the MAC signaling, information about a cell that is effective. In the cell that is indicated to be effective, the terminal device performs subsequent data processing, for example, a subsequently described process of detecting data by the terminal device. In addition, another combination manner is further included. This is not specifically limited. It should be noted that if the access network device uses this signaling combination manner, the cell that is indicated to be effective may be understood as a cell that is included in the configuration information of the cell set in this step.

The transmission method provided in this embodiment of this disclosure is applied to a license-exempt frequency band, and the cell set includes at least one cell of the license-exempt frequency band.

Step 402: The terminal device receives the configuration information sent by the access network device, where the configuration information includes identification information of the at least one cell of the license-exempt frequency band.

Step 403: The terminal device detects, by using a length of a first time as a granularity, first indication information sent by the access network device.

In this embodiment of this disclosure, the first indication information is used to indicate a transmission structure corresponding to one or more time units included in a second time of the at least one cell identified by the identification information. In other words, the first indication information indicates the transmission structure corresponding to the one or more time units included in the second time of the at least one cell included in the cell set. The cell set herein is a set including the at least one cell included in the configuration information sent by the access network device to the terminal device. The indication information may indicate a transmission structure corresponding to a time unit included in a second time in one or more cells. When the indication information may indicate transmission structures corresponding to time units included in second times in a plurality of cells, lengths of the second times corresponding to the plurality of cells may be the same or may be different. When the lengths of the second times corresponding to the plurality of cells are the same, transmission structures corresponding to the time units included in the second times corresponding to the plurality of cells may be the same or may be different. This is not specifically limited. It should be noted that the second time herein may be used to indicate that the indication information indicates a transmission structure corresponding to the at least one time unit, and a time range formed by indicated transmission duration corresponding to the at least one time unit may not have concepts of an absolute time start point and an absolute time end point.

Currently, in an NR communications system, slot format information (SFI) is supported to be carried by using a group common physical downlink control channel (GC-PDCCH). In NR, each slot includes 14 orthogonal frequency division multiplexing (OFDM) symbols, a slot structure of each slot may be represented by using states of each of the 14 OFDM symbols, and each OFDM symbol may have three states: the symbol is used for downlink data transmission, the symbol is used for uplink data transmission, or the symbol is in an unknown state. A slot structure currently supported by NR is summarized in Table 1. A total of 256 different slot formats (formats 0 to 255) may be supported. However currently, the NR supports only 62 slot formats with clear meanings, and formats 62 to 255 are currently in a reserved state. One slot format is represented by using different transmission types corresponding to the 14 OFDM symbols included in the slot, where D (downlink) indicates that the OFDM symbol is used for downlink data transmission, U (uplink) indicates that the OFDM symbol is used for uplink data transmission, and X (flexible) indicates that the OFDM symbol is in an unknown state.

In this embodiment of this disclosure, the transmission structure corresponding to the time unit may be represented by using a transmission type corresponding to each OFDM symbol included in each time unit. Alternatively, in this embodiment of this disclosure, if one time unit is one slot, a transmission structure corresponding to the one time unit may be any one of slot structures indicated by format 0 to 61 in Table 1. Certainly, the transmission structure corresponding to the time unit may alternatively be represented in another form. This is not specifically limited.

TABLE 1

Schematic table of a slot format

| Format | \multicolumn{14}{c}{Indexes of symbols included in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | X | X | X | X | X | X | D | X | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | X | U | D | D | D | D | X | U | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | U | D | D | X | X | U | U | U |

TABLE 1-continued

Schematic table of a slot format

| Format | \multicolumn{14}{c}{Indexes of symbols included in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-255 | \multicolumn{14}{c}{Reserved} |

In this embodiment of this disclosure, that the first indication information indicates the transmission structure corresponding to the time unit included in the second time in the at least one cell may be understood as that the first indication information indicates the transmission structure corresponding to the time unit included in the second time, and the second time corresponding to the transmission structure is not indicated by the first indication information. The first indication information may explicitly or implicitly indicate the transmission structure corresponding to the time unit included in the second time. For example, the first indication information explicitly indicates transmission structures corresponding to L time units, and L is a positive integer. It may be understood that the second time includes the L time units.

Optionally, the first indication information is further used to indicate a start point and an end point of the second time. Specifically, an indication manner may include the following several manners (where it should be noted that the first indication information may further have another indication manner. This is not specifically limited herein):

(1) The start point or the end point that is of the second time and that is indicated by the first indication information is related to a time unit in which the first indication information is located.

The end point that is of the second time and that is indicated by the first indication information may be explicitly indicated, or may be implicitly indicated. It should be noted that in this embodiment of this disclosure, the start point of the second time may be represented by a start boundary of a first time unit included in the second time, and the end point of the second time may be represented by a start boundary or an end boundary of a last time unit included in the second time, or may be represented in another form. This is not specifically limited.

Figure 5:
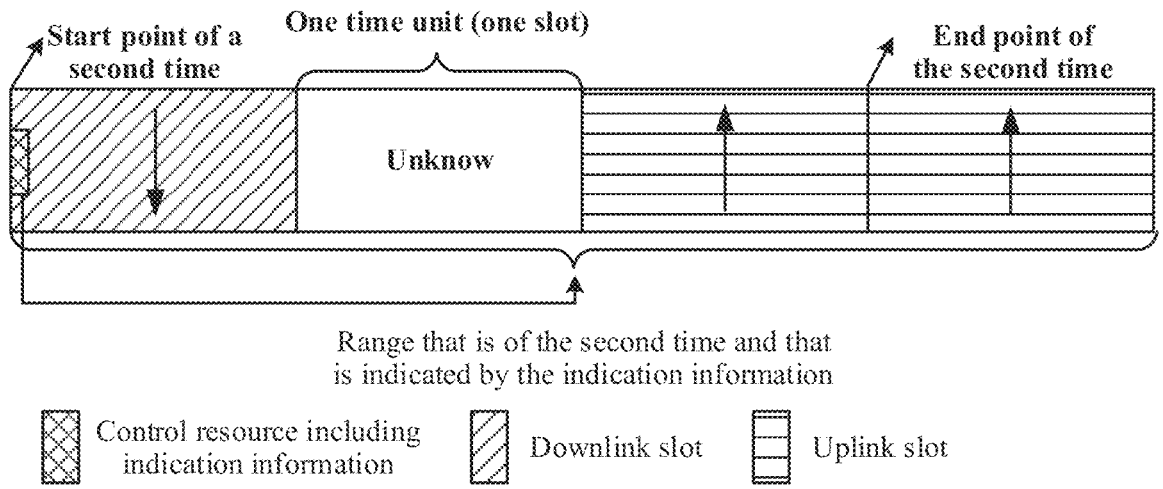
FIG. 5 is a schematic diagram of a range that is of a second time and that is indicated by indication information according to an embodiment of this disclosure.

As shown in FIG. 5, an example in which a time unit is a slot is used for description in FIG. 5. The second time indicated by indication information includes four slots, and transmission structures corresponding to the four slots indicated by the indication information respectively correspond to a format 0, a format 2, a format 1, and a format 1 in Table 1. More usually, the transmission structures corresponding to the four slots may correspond to any one of the formats 0 to 61 in Table 1. It should be noted that in this embodiment of this disclosure, a downlink slot is a slot including downlink data transmission, and the slot including downlink data transmission herein may be a slot in which all OFDM symbols included in the slot are used for downlink data transmission, or some OFDM symbols included in the slot are used for downlink data transmission, and remaining OFDM symbols are in the unknown state. An uplink slot is a slot including uplink data transmission, and the slot including uplink data transmission herein may be a slot in which all OFDM symbols included in the slot are used for uplink data transmission, or a part of OFDM symbols included in the slot are used for uplink data transmission, and a remaining OFDM symbol is in the unknown state. An unknown slot may be a slot in which all OFDM symbols included in the slot are in the unknown state.

In FIG. 5, a start point of the second time is a start boundary of a slot in which the first indication information is located, and if a time location corresponding to the last slot included in the second time is explicitly indicated, in an implementation, the first indication information directly indicates that the second time includes four slots. In another implementation, if the time location corresponding to the last slot included in the second time is implicitly indicated, the first indication information may indicate only transmission structures corresponding to the four slots. After receiving the first indication information, the terminal device may determine that the first indication information indicates that the second time includes four slots. For the latter, for example, content indicated by the first indication information is:

{a transmission structure corresponding to a slot #n, a transmission structure corresponding to a slot #(n+1), a transmission structure corresponding to a slot #(n+2), and a transmission structure corresponding to a slot #(n+3)}, where the slot #n represents an $n^{th}$ slot, and n is a positive integer.

(2) The start point that is of the second time and that is indicated by the first indication information is related to an offset of the time unit in which the first indication information is located.

Figure 6:
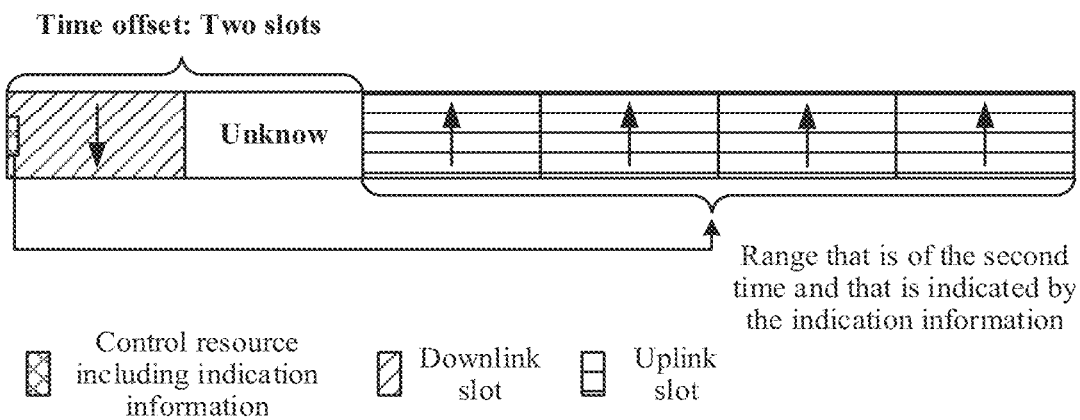
FIG. 6 is a schematic diagram of another range that is of a second time and that is indicated by indication information according to an embodiment of this disclosure.

Optionally, the start point that is of the second time and that is indicated by the first indication information is a corresponding time unit that is offset backward by a specific time offset relative to the time unit in which the first indication information is located. As shown in FIG. 6, the end point that is of the second time and that is indicated by the first indication information may be explicitly indicated, or may be implicitly indicated. In FIG. 6, the time offset is two slots.

Figure 7:
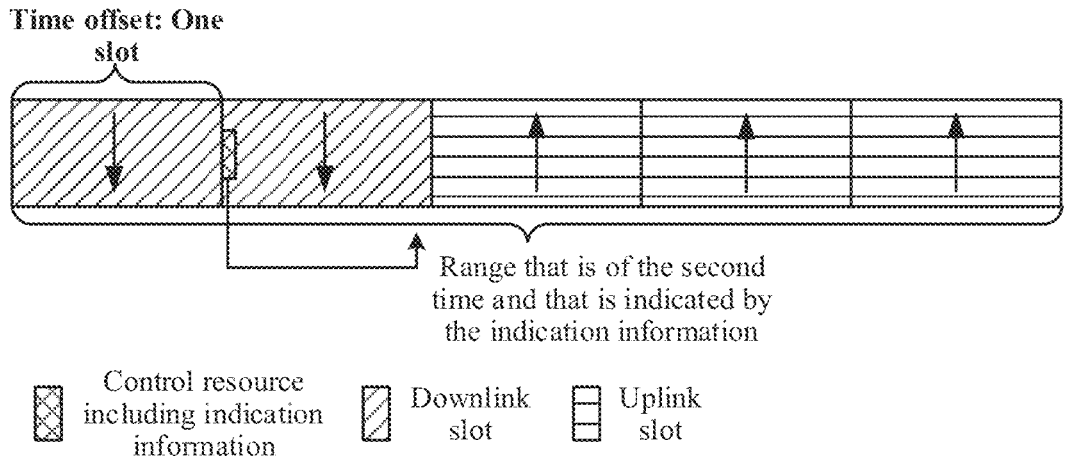
FIG. 7 is a schematic diagram of another range that is of a second time and that is indicated by indication information according to an embodiment of this disclosure.

Optionally, a start point that is of the second time and that is indicated by the first indication information is a corresponding time unit that is offset forward by a specific time offset relative to a time unit in which the first indication information is located. As shown in FIG. 7, an end point that is of the second time and that is indicated by the first indication information may be explicitly indicated, or may be implicitly indicated. In FIG. 7, the time offset is one slot.

The time offset may be indicated by using the first indication information, or may be indicated by using other information. This is not specifically limited.

In this embodiment of this disclosure, as described above, the transmission structure that corresponds to the time unit included in the second time and that is indicated by the first indication information may be represented by using a transmission type of an OFDM symbol included in each time unit, or may be directly indicated by using an index in Table 1, or may be indicated in another form. This is not specifically limited.

In this embodiment of this disclosure, a length of the first time is different from a length of the second time. That the terminal device uses the length of the first time as a granularity may be understood as that the terminal device detects, at intervals of the first time, the indication information sent by the access network device.

Optionally, step 404: The access network device sends indication information to the terminal device in a first time unit based on a result of clear channel assessment, where the indication information is used to indicate the transmission structure corresponding to the time unit included in the second time in at least one cell of the terminal device.

Preferably, when the result of the clear channel assessment is idle, to be specific, the access network device obtains a resource of a license-exempt frequency band through contention in at least one cell of the license-exempt frequency band, the access network device sends the indication information to the terminal device in the first time unit.

When the result of the clear channel assessment is not idle, that is, the access network device does not obtain the resource through contention in the at least one cell of the license-exempt frequency band, the terminal device continues to detect, by using the length of the first time as the granularity, the indication information sent by the access network device.

Figure 8:
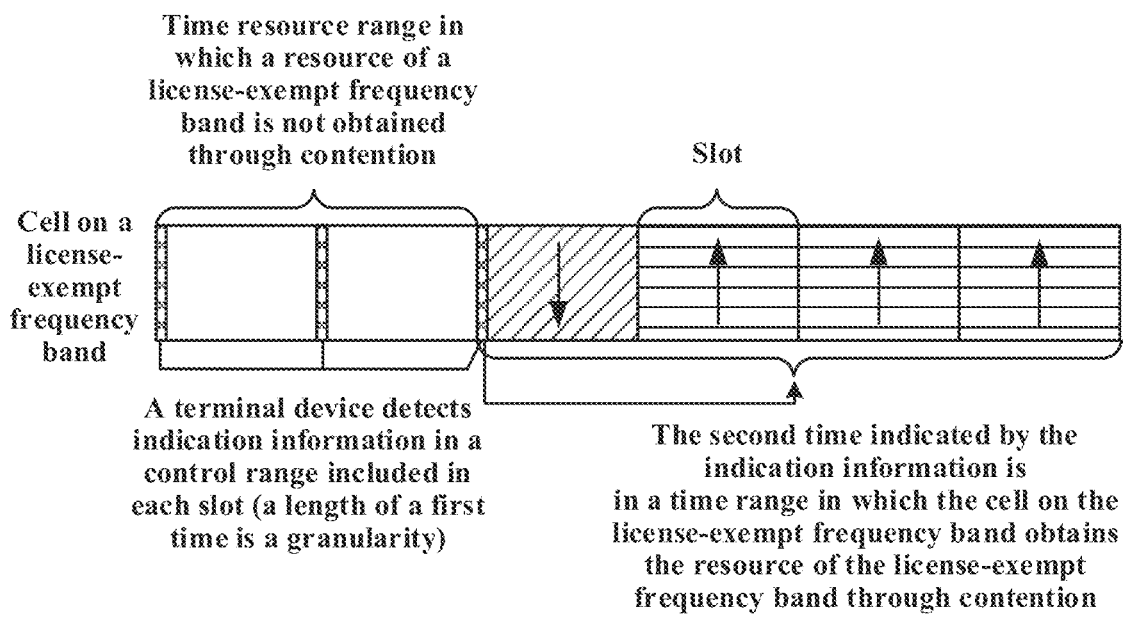
FIG. 8 is a schematic diagram of a transmission structure corresponding to a time unit included in a second time according to an embodiment of this disclosure.

In FIG. 8, the terminal device detects the indication information in each slot (the first time unit corresponds to one slot) in a time range in which the terminal device does not obtain the resource of the license-exempt frequency band through contention in the at least one cell of the license-exempt frequency band. After obtaining the resource of the license-exempt frequency band through contention in the at least one cell of the license-exempt frequency band, the access network device sends the indication information. In the example in FIG. 8, the indication information is used to indicate slot structures corresponding to four slots, and the slot structures corresponding to the four slots are respectively:

[a downlink slot, an uplink slot, an uplink slot, and an uplink slot].

It may be understood that a time range (corresponding to the second time) indicated by the indication information includes four slots. The indication information herein may be understood as the first indication information.

Because of opportunistic transmission of the cell of the license-exempt frequency band on the resource of the license-exempt frequency band, a start location for data transmission of each cell on the license-exempt frequency band on the resource of the license-exempt frequency band is uncertain. However, once the resource of the license-exempt frequency band is obtained through contention, considering overheads of common control information and that the overheads of the common control information may indicate distribution of the uplink slot, the common control information indicates distribution of uplink/downlink data transmission within a time range in which the resource is obtained through contention. Therefore, if a detection granularity used by the terminal device to detect the common control information of the at least one cell on the license-exempt frequency band matches the time range indicated by the indication information, because a start location of the data transmission of the cell on the license-exempt frequency band is uncertain, the terminal device cannot obtain, through detection, a slot structure used to indicate the time range in which the resource is obtained through contention. However, according to the method provided in this embodiment of this disclosure, a time granularity of detecting the indication information by the terminal device is different from duration indicated by the indication information, so that it may be ensured that the terminal device obtains the indication information through detection.

Optionally, that the access network device sends second indication information to the terminal device by using a length of a third time as a granularity may be understood as that the access network device sends the indication information to the terminal device at intervals of the length of the third time. Alternatively, it may be understood that the access network device sends the second indication information to the terminal device by using the length of the third time as a periodicity. The length of the third time may be represented by an integer quantity of time units. That the access network device sends the second indication information to the terminal device at intervals of the length of the third time may include that the access network device sends the second indication information to the terminal device at intervals of K time units, where K is a positive integer. Alternatively, it may be understood that a period in which the access network device sends the indication information is the K time units. In this embodiment of this disclosure, for example, one time unit may be one slot, or may be a non-slot in which transmission duration is less than one slot, or may be a time unit having other transmission duration. Duration (slot duration) corresponding to the one slot may be related to a subcarrier spacing (SCS). For example, in an NR system, slot duration that corresponds to different SCSs and that is supported is shown in Table 2. Alternatively, one time unit may be one subframe or one radio frame (radio frame). Duration of one subframe may be 1 ms, and duration of one radio frame may be 10 ms. The length of the third time, the time unit, and the slot duration may further be represented in another form or have other values. This is not specifically limited.

It should be noted that the second indication information is used to indicate a transmission structure corresponding to one or more time units included in a fourth time in at least one cell (for example, a cell having identification information) included in the configuration information sent by the access network device. Optionally, the fourth time is not exactly the same as the second time. It should be noted that in this embodiment of this disclosure, that the fourth time is not exactly the same as the second time may be understood as that a time range included in the fourth time is not overlapped with a time range included in the second time, or a time range included in the fourth time is partially but not totally overlapped with a time range included in the second time.

TABLE 2

Table of correspondence between different SCSs and slot duration

| SCS (kHz) | Slot duration (ms) |
|---|---|
| 15 | 1 |
| 30 | 0.5 |
| 60 | 0.25 |
| 120 | 0.125 |
| 240 | 0.0625 |
| 480 | 0.03125 |

Optionally, step 405: The terminal device receives the indication information sent by the access network device.

In this embodiment of this disclosure, a transmission status of each OFDM symbol included in each time unit included in the second time may be represented by D/U/X. A meaning of D/U/X is described above, and details are not described herein again. Alternatively, any time unit included in the second time may be represented by using any one of formats 0 to 255 in Table 1. For ease of description, in this embodiment of this disclosure, if OFDM symbols included in any time unit included in the second time are used for downlink data transmission, or some OFDM symbols included in one time unit are used for downlink data transmission and some OFDM symbols are in an unknown state, or some OFDM symbols included in one slot are used for downlink data transmission and some OFDM symbols are used for a guard period (GP), the time unit may be considered as a time unit used for downlink data transmission. If all OFDM symbols included in any time unit included in the second time are used for uplink data transmission, or some OFDM symbols are used for uplink data transmission and some OFDM symbols are in the unknown state, or some OFDM symbols are used for uplink data transmission and some OFDM symbols are used for the GP, the time unit may be considered as a time unit used for uplink data transmission. If a time unit includes both an OFDM symbol used for downlink data transmission and an OFDM symbol used for uplink data transmission, the time unit may be considered as a special time unit. If all OFDM symbols included in a time unit are in an unknown state, the time unit may be considered as an unknown time unit.

Optionally, in this embodiment of this disclosure, a periodicity in which the access network device sends the indication information (for example, the first indication information and the second indication information) may be represented by an integer quantity of time units. A time length (for example, the length of the second time or the length of the fourth time) indicated by the indication information may also be represented by the integer quantity of time units, for example, represented by a quantity of time units included in the second time or a quantity of time units included in the fourth time. It should be noted that in this embodiment of this disclosure, if the length of the first time is measured by the quantity of time units, a type of a time unit (represented by a time unit A for ease of description) used to measure the length of the first time may be the same as or different from a type of a time unit (represented by a time unit B for ease of description) included in the second time. Similarly, in the second time, the access network device sends the indication information by using the length of the third time as the granularity. A type of a time unit included in the third time may be the same as or different from the type of the time unit included in the second time unit, and may be the same as or different from the type of the time unit included in the first time. The type of the time unit herein may be, for example, duration of the time unit. For example, as described above, one time unit included in the first time may be one radio frame, and one time unit included in the second time may be one slot. Alternatively, one time unit included in the first time is one slot, and one time unit included in the second time may also be one slot. For another example, the time unit A and the time unit B may be slots with same transmission duration. Alternatively, the time unit A may be a non-slot, and the time unit B may be a slot. Alternatively, the time unit A may be a slot, and the time unit B may be a non-slot, or the like. It should be noted that the foregoing description is also applicable to a description of a relationship between a type of a time unit corresponding to another granularity of the indication information and a type that is of a time unit and that is included in a time length indicated by the indication information.

Figure 9:
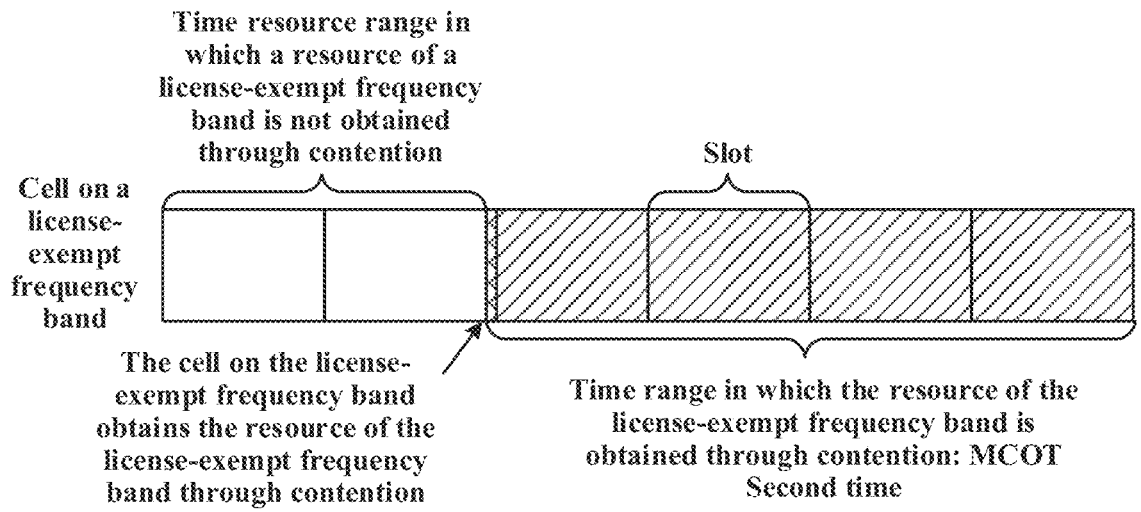
FIG. 9 is a schematic diagram of another transmission structure corresponding to a time unit included in a second time according to an embodiment of this disclosure.

In this embodiment of this disclosure, there may be the following several understandings for a time range in which the at least one cell obtains the resource of the license-exempt frequency band through contention:

(1) The time range is a subset of a time range that corresponds to an MCOT in which data transmission may be performed after the at least one cell obtains the resource of the license-exempt frequency band through contention. The data transmission herein includes sending data and/or receiving data. In this embodiment of this disclosure, one MCOT may also be considered as transmission duration corresponding to one transmission opportunity (TxOP, which may also be referred to as a transmission occasion), for example, as shown in FIG. 9.

Figure 10:
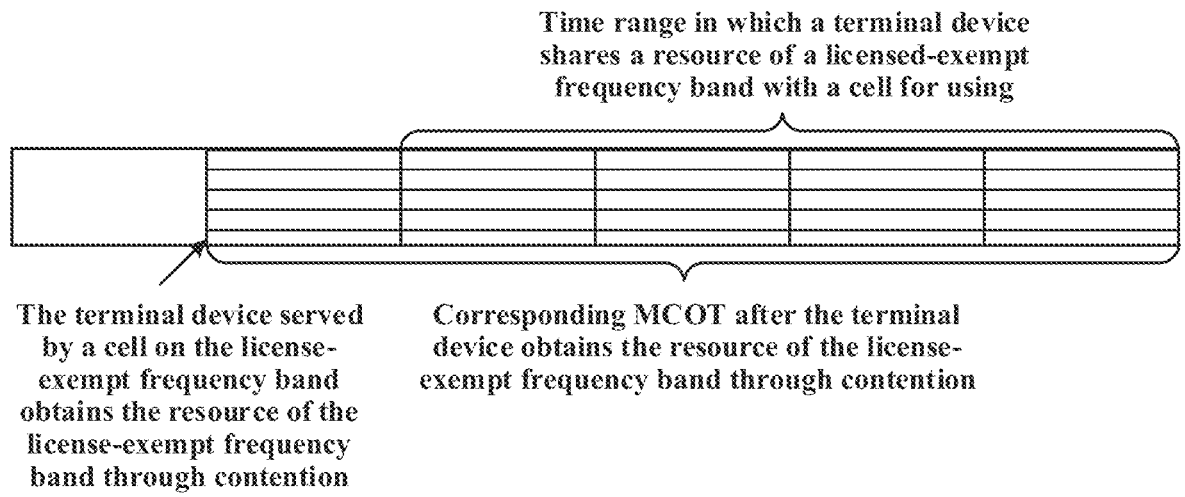
FIG. 10 is a schematic diagram showing that a terminal device shares an MCOT with an access network device according to an embodiment of this disclosure.

(2) The time range may be a time range in which after obtaining the resource of the license-exempt frequency band through contention, one terminal device or any terminal device served by the cell of the license-exempt frequency band shares the resource of the license-exempt frequency band with the cell for data transmission. For example, one terminal device served by the cell of the license-exempt frequency band is used as an example. After obtaining the resource of the license-exempt frequency band through contention, the terminal device also corresponds to one MCOT. The terminal device may notify the access network device of a usage time that is in the MCOT and that may be shared with the access network device. In the shared time, the access network device may not use the CCA to evaluate availability of the channel, or may use only the CCA (for example, one shot) that does not include random backoff to evaluate the availability of the channel. FIG. 10 shows an implementation in which a terminal device shares an MCOT with an access network device.

(3) The time range may be a subset of a time range that corresponds to an MCOT in which data transmission may be performed after one cell in the cell set obtains the resource of the license-exempt frequency band through contention. For example, if the cell set includes a cell A and a cell B, after obtaining the resource of the license-exempt frequency band through contention, the cell A may share, with the cell B for using, the subset of the time range that corresponds to the MCOT in which data transmission may be performed. To be specific, within the MCOT, the cell B may directly perform data transmission without using the CCA to evaluate the availability of the resource of the license-exempt frequency band, or may evaluate the availability of the resource of the license-exempt frequency band by using a CCA mechanism (for example, one shot LBT) without random backoff.

(4) The time range may be a time range in which after obtaining the resource of the license-exempt frequency band through contention, a terminal device served by one cell in the cell set shares the resource of the license-exempt frequency band with another cell for data transmission. For example, if the cell set includes the cell A and the cell B, after obtaining the resource of the license-exempt frequency band through contention, the terminal device served by the cell A may share, with the cell B for using, the subset of the time range that corresponds to the MCOT in which data transmission may be performed.

(5) More usually, the time range in which the at least one cell obtains the resource of the license-exempt frequency band through contention may be a time range formed by a time unit corresponding to transmission data in the cell, and may further be a time range within a predetermined duration range.

In this embodiment, the time unit included in the second time may have the following forms. It should be noted that the following features are also applicable to the time unit included in the fourth time.

Figure 11:
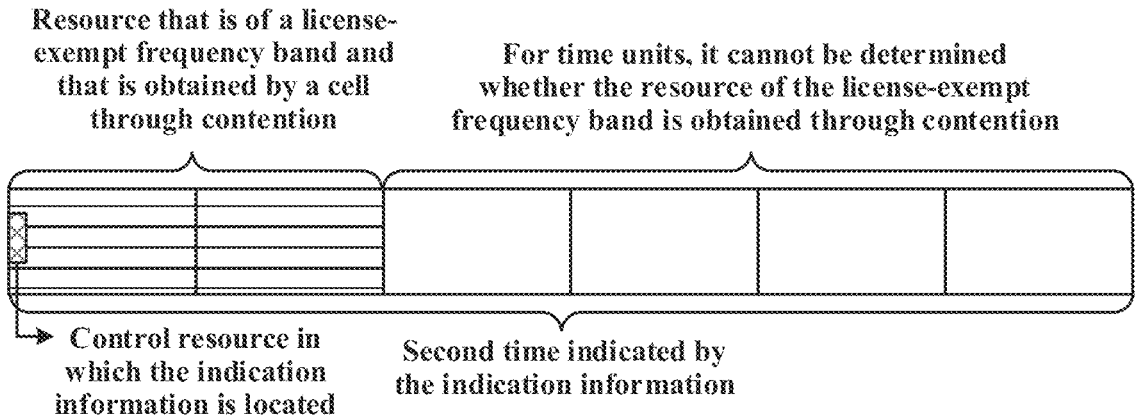
FIG. 11 is a schematic diagram of another transmission structure corresponding to a time unit included in a second time according to an embodiment of this disclosure.

(a) All time units included in the second time fall within the time range in which the at least one cell obtains the resource of the license-exempt frequency band through contention;

(b) One or more time units included in the second time fall within the time range in which the at least one cell obtains the resource of the license-exempt frequency band through contention; and (c) One or more time units included in the second time fall within the time range in which the at least one cell obtains the resource of the license-exempt frequency band through contention, and for one or more other time units, when the access network device sends the indication information in the cell, it still cannot be determined whether the cell or the terminal device served by the cell can obtain the resource of the license-exempt frequency band through contention on the time units. FIG. 11 shows an implementation. For example, the indication information may indicate that the last two time units of the second time are uplink time units, and the third time unit and the fourth time unit that are included in the second time are unknown time units. For the last two uplink time units, whether the terminal device can obtain the resource of the license-exempt frequency band through contention is not limited.

Optionally, in this embodiment of this disclosure, the second time includes at least one time unit in which a result of clear channel assessment is idle, and/or includes at least one time unit associated with a channel listening mechanism without random backoff. The time unit in which the result of the clear channel assessment is idle indicates that when using the time unit, the access network device and/or the terminal device do/does not need to determine availability of the time unit through the clear channel assessment. For example, the time unit is a time unit that is included in a corresponding MCOT after the access network device obtains the resource of the license-exempt frequency band through contention and that is used for downlink data transmission. The time unit associated with the channel listening mechanism without random backoff indicates that when using the time unit, the access network device and/or the terminal device may determine the availability of the time unit through the channel listening mechanism without random backoff. For example, the time unit may be a time unit that is included in a corresponding MCOT after the access network device obtains the resource of the license-exempt frequency band through contention and that is used for uplink data transmission.

It should be noted that in this embodiment of this disclosure, the time range in which the at least one cell does not obtain the resource of the license-exempt frequency band through contention may include at least the following two understandings.

In one case, a moment at which the terminal device determines that the at least one cell does not obtain the resource of the license-exempt frequency band through contention is the same as a moment at which the cell does not obtain the resource of the license-exempt frequency band through contention. In other words, the time range that is determined by the terminal device and in which the cell does not obtain the resource of the license-exempt frequency band through contention matches a time range in which the cell actually does not obtain the resource of the license-exempt frequency band through contention. In this embodiment of this disclosure, the terminal device may determine, in a manner of detecting a reference signal, indication information, data scheduling information, or the like, whether the cell obtains the resource of the license-exempt frequency band through contention. For example, if obtaining a signal or information sent by a cell on the resource of the license-exempt frequency band through detection, the terminal device may determine that the cell obtains the resource of the license-exempt frequency band through contention in a time unit in which the signal or the information is sent. If no signal or information sent by the cell on the resource of the license-exempt frequency band is obtained through detection, it may indicate that the cell does not obtain the resource of the license-exempt frequency band through contention within at least a time unit including the signal or the information (not sent).

In another case, at the moment that is determined by the terminal device and at which a cell does not obtain the resource of the license-exempt frequency band through contention, the cell has actually obtained the resource of the license-exempt frequency band through contention. This case occurs because the terminal device may miss detecting a signal or information used to indicate that the cell has obtained the resource of the license-exempt frequency band through contention. The information may be indication information, or may be another control information.

Optionally, within the second time indicated by indication information A (the indication information A and the following indication information B indicate indication information detected at different moments, and the indication information A may be considered as an example of the first indication information), a detection behavior of the terminal device may include:

(i) The terminal device may no longer detect the indication information B (the indication information B may be considered as an example of the second indication information). Herein, the indication information B and the indication information A have a same function, but content indicated by the indication information A and content indicated by the indication information B may be the same or different. For example, both the indication information A and the indication information B may be information used to indicate that the information is associated with slot format information SFI, but indicated content may be different. Specifically, FIG. 1 is used as an example. It is assumed that the indication information A indicates transmission structures corresponding to six slots, and the transmission structures are respectively:

[a downlink slot, a downlink slot, an unknown slot, an unknown slot, an uplink slot, and an uplink slot]

In this case, the terminal device may no longer detect the SFI within a time range including the six slots.

(ii) The terminal device may continue detecting the indication information B (the indication information B may be considered as an example of the second indication information). A relationship between the indication information B and the indication information A is described above. Specifically, the terminal device may detect the indication information B at intervals of a fixed quantity of slots in the second time, and duration corresponding to a time range indicated by the indication information B that is obtained through contention may be the same as or different from duration corresponding to a time granularity in which the terminal device detects the indication information B. The time range indicated by the indication information B may or may not overlap with the time range indicated by the indication information A. This is not specifically limited. It should be noted that when the terminal device detects the indication information B in each of M slots, a time granularity in which the terminal device detects the indication information B may be understood as M slots.

Figure 12:
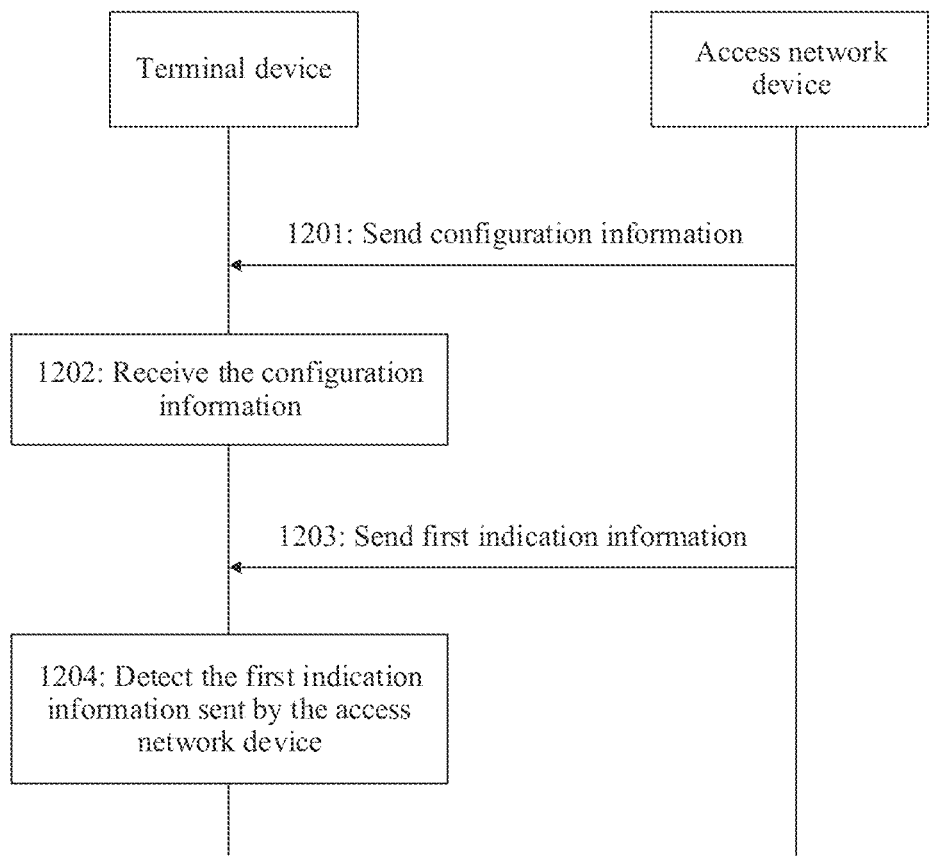
FIG. 12 is a schematic flowchart of another indication information transmission method according to an embodiment of this disclosure.

An embodiment of this disclosure further provides an indication information transmission method. As shown in FIG. 12, similarly, the transmission method may be applied to the network architecture shown in FIG. 1, the access network device in the method may be applied to the schematic structural diagram of FIG. 2, and the terminal device may be applied to the schematic structural diagram of FIG. 3. In the method provided in this embodiment of this disclosure, data transmission on a licensed frequency band is used as an example. The transmission method includes the following steps.

Step 1201: The access network device sends configuration information to a terminal device, where the configuration information includes identification information of at least one cell.

Optionally, the configuration information further includes configuration information of a cell set. The transmission method provided in this embodiment of this disclosure is applied to a licensed frequency band, and the cell set includes at least one cell of the licensed frequency band.

Related content of the cell, the cell set, and the manner in which the access network device sends the configuration information of the cell set is the same as the content in step 401, and details are not described herein again.

Step 1202: The terminal device receives the configuration information sent by the access network device, where the configuration information includes identification information of at least one cell of the licensed frequency band.

Step 1203: The access network device sends first indication information to the terminal device in a first time unit, where the indication information is used to indicate a transmission structure corresponding to a time unit included in a second time of at least one cell of the terminal device.

Because this embodiment of this disclosure is applied to the licensed frequency band, the access network device does not need to contend for a resource. Therefore, the access network device sends the indication information to the terminal device at intervals of a length of the first time. Related content thereof is the same as related content in step 404, and details are not described herein again.

Step 1204: The terminal device detects, by using a length of a first time as a granularity, the first indication information sent by the access network device.

In a scenario of the licensed frequency band, because the access network device sends the indication information to the terminal device in the first time unit at intervals of the length of the first time, that the terminal device detects the indication information is equivalent to that the terminal device receives, in the first time unit by using the length of the first time as the granularity, the indication information sent by the access network device.

In this embodiment of this disclosure, the length of the first time is different from a length of the second time. For example, a periodicity in which the access network device sends the first indication information is different from the length of the second time indicated by the first indication information, or a periodicity in which the terminal device detects the first indication information is different from the length of the second time indicated by the first indication information. An advantage of doing this is that for the resource of the licensed frequency band:

(1) If a sending period of the first indication information is less than the length of the second time indicated by the first indication information, the access network device may dynamically adjust a transmission structure of a time unit that is used for data transmission and that is on the licensed frequency band, to adapt to a type of a to-be-sent and/or to-be-received service on an access network device side.

Figure 13:
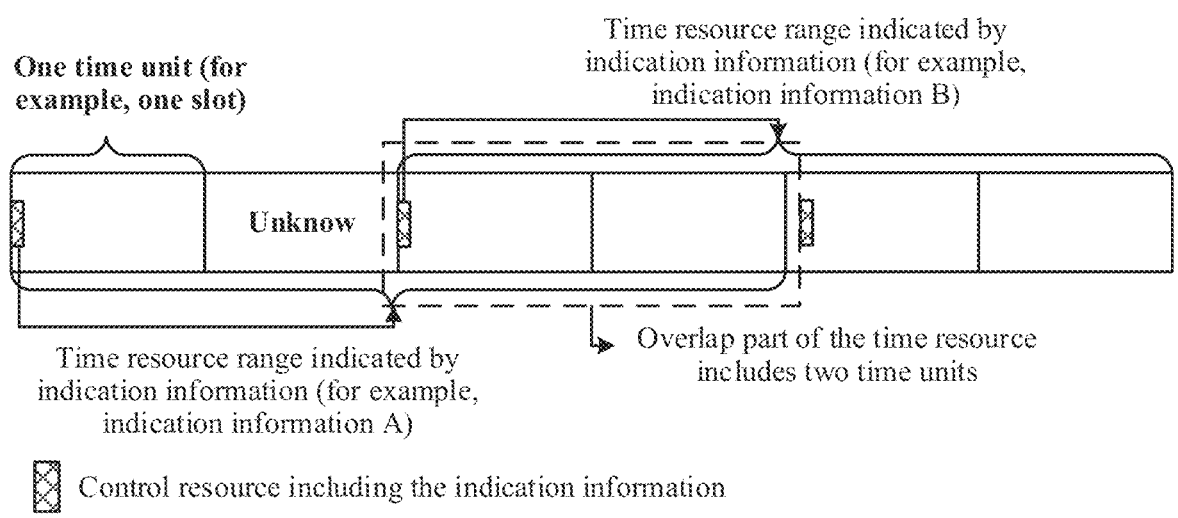
FIG. 13 is a schematic diagram showing a sending period of indication information and duration corresponding to a time resource indicated by the indication information according to an embodiment of this disclosure.

For example, as shown in FIG. 13, the sending period of the first indication information is less than the length that is of the second time and that is indicated by the indication information. The sending period of the first indication information is two slots, and a time resource range indicated twice includes four slots. A transmission structure indicated by the indication information (the indication information B) sent by a subsequent time unit may cover the transmission structure indicated by the indication information (the indication information A) sent by the previous time unit. The coverage herein means that for a time unit included in a part in which the time resource range indicated by the indication information A is overlapped with the time resource range indicated by the indication information B, if the terminal device obtains the indication information B through detection, a transmission structure that is of the time unit and that is indicated by the indication information B is used. It should be noted that if the terminal device misses detecting the indication information B, that is, the access network device sends the indication information B, but the terminal device does not obtain the indication information through detection, to ensure that the terminal device does not obfuscate transmission structures of the time unit, preferably, transmission structures indicated by the time unit included in the part in which the time resource range indicated by the indication information A is overlapped with the time resource range indicated by the indication information B are the same. In this way, FIG. 13 is used as an example. For the six time units shown in FIG. 13, because different indication information is used, and transmission structures of a third time unit and a fourth time unit are also the same, even if the terminal device misses detecting the indication information B, the transmission structures of the third time unit and the fourth time unit that are in the six time units shown in FIG. 13 are not obfuscated, so that data transmission efficiency may be ensured. For the last two time units included in the six time units shown in FIG. 13, because the terminal device misses detecting the indication information B, transmission structures of the two time units are not predetermined. Herein, the indication information A may be considered as the first indication information, the indication information B may be considered as second indication information, and time ranges (which may respectively correspond to the second time and the fourth time) respectively indicated by the indication information A and the indication information B are not exactly the same. Alternatively, both the indication information A and the indication information B may be considered as the first indication information, but are indication information sent at different moments, and time ranges indicated by the indication information A and the indication information B are not exactly the same.

Figure 14:
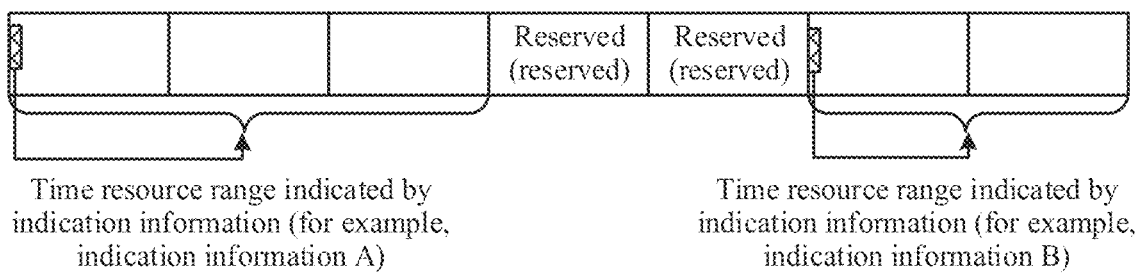
FIG. 14 is a schematic diagram showing another sending period of indication information and another duration corresponding to a time resource indicated by the indication information according to an embodiment of this disclosure.

(2) According to another aspect, when the access network device and the terminal device perform data transmission, some time units need to be configured by using higher layer signaling, and need to be reserved in advance for downlink data transmission, uplink data transmission, or downlink data transmission and uplink data transmission. The time units reserved in advance may be used by the access network device to send a periodic signal or periodic information. The terminal device may measure channel state information (CSI) by using the periodic signals, and/or perform RRM measurement by using the periodic signals, or perform another operation. The terminal device may further obtain system information (SI) or obtain other information by using the periodic information. In addition, the time units reserved in advance may be used by the access network device to receive periodic information sent by the terminal device. The periodic information may be, for example, a sounding reference signal (SRS), CSI, or other information. In addition, the time units reserved in advance may further be used for interference coordination between different access network devices. In addition, the time units reserved in advance may further be used for another purpose. This is not specifically limited in this embodiment of this disclosure. For the time units reserved in advance, the indication information does not need to be used any more to indicate the transmission structure corresponding to the time unit. Therefore, according to the method in this embodiment of this disclosure, the sending period of the indication information may be greater than duration (the length of the second time) corresponding to the time resource range indicated by the indication information. Therefore, in the reserved time units, the terminal device does not need to detect the indication information any more, so that a benefit of power saving may be achieved. For example, as shown in FIG. 14, it should be noted that for indication information sent at different moments, associated lengths of the second time may be the same or may be different. Herein, the indication information sent at different moments may also be understood as the first indication information and the second indication information. More usually, content that is of the control information and that is indicated by the indication information sent at different moments may be the same or may be different. For example, even if lengths of second times associated with the indication information sent by the access network device at different moments are the same, transmission structures corresponding to the time units included in the second times associated with the indication information sent by the access network device at different moments may be the same or may be different. For example, in FIG. 14, the time resource range (for example, considered as within the second time) indicated by the indication information (the indication information A) that is first sent by the access network device includes three time units, the time resource range (for example, considered as within the fourth time) indicated by the indication information (the indication information B) that is sent later by the access network device includes two time units, and there is an interval of five time units between the indication information A first sent by the access network device and the indication information B sent later by the access network device.

For another example, in FIG. 13, both the time resource range (that is, within the second time) indicated by the indication information (the indication information A) first sent by the access network device and the time resource range (that is, within the fourth time) indicated by the indication information (the indication information B) that is sent later by the access network device include four time units, a transmission structure of a time unit corresponding to the indication information A may be the same as or different from a transmission structure of a time unit corresponding to the indication information B. When the lengths that are of the second time and that are indicated by the indication information (for example, the indication information is considered as the first indication information) sent by the access network device at different moments are different, in this embodiment of this disclosure, that the length of the first time is different from the length of the second time may be understood as that the length of the first time is different from the length that is of the second time and that corresponds to the indication information first sent by the access network device, and/or the length of the first time is different from the length that is of the second time and that corresponds to the indication information that is sent later by the access network device. The length of the first time may be understood as a time interval between a time unit in which the indication information first sent by the access network device is located and a time unit in which the indication information that is sent later by the access network device is located. The time interval may be determined by a start boundary of the time unit. Alternatively, another manner may be used. This is not specifically limited in this embodiment of this disclosure.

It should be noted that in this embodiment of this disclosure, indication information that is sent by the access network device at different moments and that is used to indicate a transmission structure corresponding to the time unit included in a time range may be considered as the first indication information, or may be respectively considered as the first indication information and the second indication information. In this embodiment of this disclosure, a time length (namely, the first time) corresponding to a granularity for detecting the first indication information by the terminal device and a time length that corresponds to a time range (namely, the second time) and that is indicated by the first indication information meet the following relationship: the length of the first time is different from the length of the second time. In addition, for another indication information that may indicate a transmission structure corresponding to one or more time units included in a time range, if the terminal device performs detection by using a time length as a granularity, the time length may also be different from the time length corresponding to the time range.

It should be noted that the foregoing benefits and effects of the licensed frequency band are also applicable to the license-exempt frequency band.

In addition, regardless of the licensed frequency band or the license-exempt frequency band, in the method provided in this embodiment of this disclosure, the indication information is further used to indicate a start location of the second time that includes the time unit and that is of at least one serving cell of the terminal device.

It should be noted that regardless of the licensed frequency band or the license-exempt frequency band, in the method provided in this embodiment of this disclosure, the transmission structure corresponding to the time unit included in the second time is a subset of the transmission structure corresponding to the time unit included in the fourth time. A time offset between the first time unit included in the second time and the first time unit included in the fourth time unit is associated with the indication information. A meaning of the association herein may indicate that the terminal device may determine the time offset based on the first indication information used to indicate the transmission structure of the time unit included in the second time.

In this embodiment of this disclosure, the terminal device may further receive configuration information that is of the transmission structure and that is sent by the access network device. The configuration information of the transmission structure includes M time units and a transmission structure corresponding to each time unit. Optionally, the configuration information of the transmission structure may be sent by using one or more of RRC signaling, MAC signaling, or physical layer signaling, or may be predefined, or may be sent in another manner. This is not specifically limited. The first indication information includes indication information of an $i^{th}$ time unit in the M time units. The terminal device determines i based on the first indication information, and then determines, with reference to the M time units configured by using the configuration information of the transmission structure, the transmission structure corresponding to the time unit included in the second time. Specifically, transmission structures corresponding to (M−i+1) time units included in the second time may be determined, where a transmission structure corresponding to a $j^{th}$ time unit in the (M−i+1) time units is a transmission structure corresponding to an (i+j−1)*time unit in the M time units configured by using the configuration information of the transmission structure, 1≤i≤M, 1≤j≤M−i+1, and i and j are natural numbers.

Figure 15:
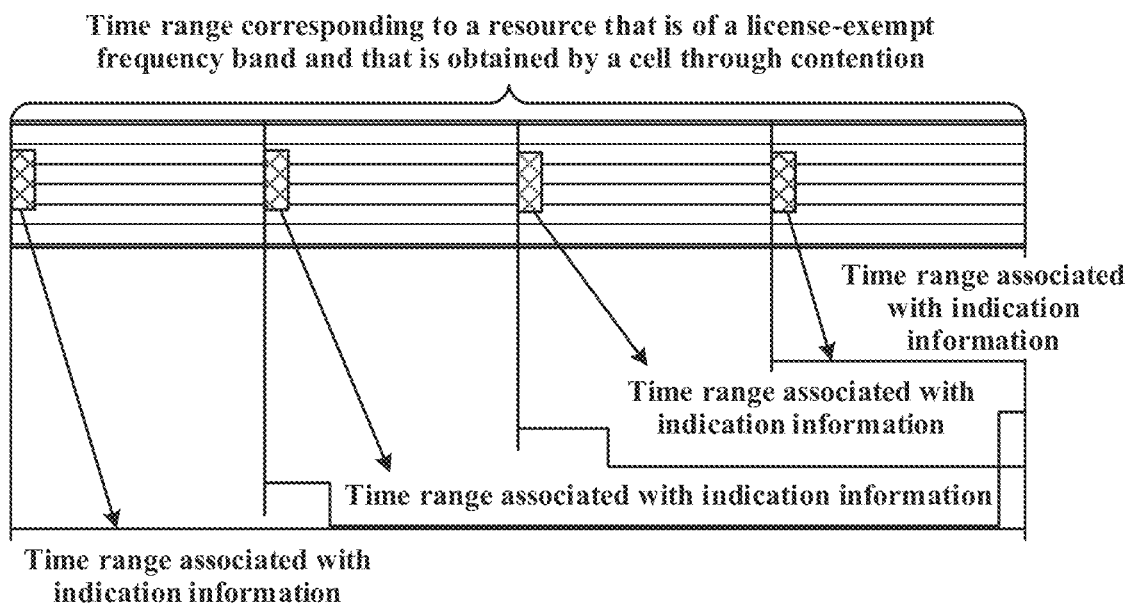
FIG. 15 is a schematic diagram showing that indication information is repeatedly sent according to an embodiment of this disclosure.

The license-exempt frequency band is used as an example. As described above, because sending of the indication information may support the terminal device in identifying a downlink burst, performing correct CSI measurement, and determining an uplink resource location at which one shot LBT may be performed, the indication information may be repeatedly sent within a time range in which the resource of the license-exempt frequency band is obtained through contention. In this way, a probability that the terminal device obtains the indication information through detection is increased, thereby ensuring obtaining of the foregoing beneficial effects, or ensuring transmission reliability of the indication information. According to another aspect, for time units belonging to a same MCOT, to ensure that the terminal device does not misunderstand the indication information, preferably, it needs to be ensured that for the time units belonging to the same MCOT, transmission structures that are of time units and that are indicated by indication information that is repeatedly sent are the same. It should be noted that same as the foregoing understanding, in this embodiment of this disclosure, indication information that is repeatedly sent only represents that functions of the indication information are the same, and content indicated by the indication information sent at different moments may be the same or may be different. This is not specifically limited. FIG. 15 is a schematic diagram showing that indication information is repeatedly sent according to an embodiment of this disclosure. In FIG. 15, time ranges associated with indication information sent at different moments are different. For example, based on a time sequence, quantities of time units (for example, slots) included in the time ranges associated with the indication information sent at different moments are respectively 4, 3, 2, and 1.

FIG. 15 is still used as an example. Assuming that one time unit is one slot, there are at least the following two implementations of indicating, in a time range in which the at least one cell obtains the resource of the license-exempt frequency band through contention, transmission structures corresponding to four slots.

(a) Configuration of RRC signaling is shown in Table 3. In Table 3, each transmission structure may be a transmission structure corresponding to any slot in Table 1, or more usually, each OFDM state included in a slot corresponding to each transmission structure may be represented by D/U/X. In expression, a transmission structure i–j (i is not less than 1 and not greater than 4, j is not less than 1 and not greater than 4, and i and j are positive integers) represents a transmission structure corresponding to a $j^{th}$ slot corresponding to an information index i. Different information indexes may be indicated by using indication information. For example, the indication information includes 2-bit information, and may respectively correspond to an index 1 of the indication information to an index 4 of the indication information in the configuration of the RRC signaling. More specifically, for example, 00 in the indication information corresponds to the index 1 of the indication information, 01 corresponds to the index 2 of the indication information, 10 corresponds to the index 3 of the indication information, and II corresponds to the index 4 of the indication information. Alternatively, there may be another correspondence. This is not specifically limited. Correspondingly, based on FIG. 15, the indication information sent in the first slot may include information associated with the index 1 of the indication information. The indication information sent in the second slot may include information associated with the index 2 of the indication information. The indication information sent in the third slot may include information associated with the index 3 of the indication information. The indication information sent in the fourth slot may include information associated with the index 4 of the indication information.

TABLE 3

| | First slot | Second slot | Third slot | Fourth slot |
|---|---|---|---|---|
| First information index 1 | Transmission structure 1-1 | Transmission structure 1-2 | Transmission structure 1-3 | Transmission structure 1-4 |
| First information index 2 | Transmission structure 2-1 | Transmission structure 2-2 | Transmission structure 2-3 | |
| First information index 3 | Transmission structure 3-1 | Transmission structure 3-2 | | |
| First information index 4 | Transmission structure 4-1 | | | |

(b) In another implementation, for indication information sent at different moments, the access network device configures only one transmission structure by using the RRC signaling. To be specific, as shown in Table 4, similarly, transmission structures 1 to 4 herein may be transmission structures corresponding to any slot in Table 1, or more usually, each OFDM state included in the slots corresponding to the transmission structures 1 to 4 may be represented by D/U/X. The indication information used to indicate the transmission structure corresponding to the time unit included in the second time is further used to indicate an effective start location of the transmission structure indicated by the indication information. Based on FIG. 12, the indication information may be separately sent in control regions included in the four slots. A transmission structure corresponding to a time unit associated with the indication information is shown in Table 4, and the indication information sent in the first slot (or the first time unit) is used to instruct the terminal device to determine, starting from the first slot configured by using the RRC signaling, slot structures corresponding to the four slots (that is, respectively corresponding to the transmission structures 1 to 4). The indication information sent in the second slot is used to instruct the terminal device to determine, starting from the second slot configured by using the RRC signaling, slot structures (respectively corresponding to transmission structures 2 to 4) corresponding to three slots. The indication information sent in the third slot is used to instruct the terminal device to determine, starting from the third slot configured by using the RRC signaling, slot structures (respectively corresponding to the transmission structure 3 and the transmission structure 4) corresponding to two slots. The indication information sent in the fourth slot is used to instruct the terminal device to determine, starting from the fourth slot configured by using the RRC signaling, a slot structure (corresponding to the transmission structure 4) corresponding to one slot. Compared with the first indication manner, in this indication manner, for the configuration of the RRC signaling, only one direction structure that is of data transmission and that corresponds to the four slots needs to be configured, and four different slot structures do not need to be configured by using the RRC signaling, thereby reducing overheads of the RRC signaling.

TABLE 4

| First slot | Second slot | Third slot | Fourth slot |
|---|---|---|---|
| Transmission structure 1 | Transmission structure 2 | Transmission structure 3 | Transmission structure 4 |

Based on Table 4, the configuration information of the transmission structure is shown in Table 4. To be specific, the configuration information of the transmission structure includes four slots and transmission structures corresponding to the four slots. The first indication information may include indication information of the first slot in the four slots. For example, in a manner, the first indication information may include the indication information of the first slot in the four slots. The terminal device receives the first indication information, and may determine, with reference to the configuration information of the transmission structure, that the second time includes the four slots. In addition, transmission structures of the four slots from the first slot to the fourth slot respectively correspond to transmission structures of the four slots from the first slot to the fourth slot that are configured by using the configuration information of the transmission structure. In another manner, for example, the first indication information may include the indication information of the second slot in the four slots. The terminal device receives the first indication information, and may determine, with reference to the configuration information of the transmission structure, that the second time includes three slots. In addition, transmission structures of the three slots from the first slot to the third slot respectively correspond to transmission structures of the four slots from the second slot to the fourth slot that are configured by using the configuration information of the transmission structure. In another manner, for example, the first indication information may include indication information of the third slot in the four slots. The terminal device receives the first indication information, and may determine, with reference to the configuration information of the transmission structure, that the second time includes two slots. In addition, transmission structures of the two slots from the first slot to the second slot respectively correspond to transmission structures of the four slots from the third slot to the fourth slot that are configured by using the configuration information of the transmission structure.

In this embodiment of this disclosure, in another optional implementation, the first indication information includes an indication of an $i^{th}$ time unit or an $(i+1)^{th}$ time unit in the M time units, and the terminal device may determine, based on the configuration information of the transmission structure and the first indication information, that the second time includes i time units, and a transmission structure corresponding to a $j^{th}$ time unit in the i time units is a transmission structure corresponding to the $j^{th}$ time unit in the M time units included in the configuration information of the transmission structure, where $1 \leq i \leq M$, $1 \leq j \leq i$, and i and j are natural numbers. Table 4 is still used as an example. Assuming that the first indication information includes the indication information of the third slot in the four slots, the terminal device may determine that the second time includes two slots. In addition, transmission structures of the two slots from the first slot to the second slot respectively correspond to the first slot to the second slot in the four slots configured by using the configuration information of the transmission structure.

More usually, the first indication information includes specific indication information, and the terminal device may determine, based on the specific information, a time unit that is in the M time units included in the configuration information of the transmission structure and that corresponds to the first time unit and/or the last time unit in the time unit included in the second time. The specific information may explicitly indicate the correspondence, or may implicitly indicate the correspondent, or may explicitly and implicitly indicate the correspondence. For example, in the foregoing example, that the terminal device determines transmission structures corresponding to (M−i+1) time units included in the second time may be understood as that the specific information explicitly indicates a location of the first time unit that is in the time units included in the second time and that is in the M time units included in the configuration information of the transmission structure. For another example, in the foregoing example, that the terminal device determines the transmission structures corresponding to the i time units included in the second time may be understood as that the specific information explicitly indicates a location of the last time unit that is in the time units included in the second time and that is in the M time units included in the configuration information of the transmission structure.

It should be noted that in the foregoing example, the first indication information or another indication information different from the first indication information may be used to indicate the time unit (for example, the $i^{th}$ time unit or the $(i+1)^{th}$ time unit) in the M time units.

It should be noted that in this embodiment of this disclosure, the foregoing indication manner is also applicable to another indication information, for example, the second indication information, used to indicate a transmission structure corresponding to one or more time units included in a time range.

It should be noted that in this embodiment of this disclosure, different from Table 4, a plurality of transmission structures may further be configured in the configuration information of the transmission structure. For example, K transmission structures may be defined for the four slots, where K is greater than 1. In this case, the indication information (for example, the first indication information and the second indication information in this embodiment of this disclosure) used to indicate the transmission structure corresponding to the one or more time units included in the time range may further indicate a transmission structure that is in the K transmission structures and that is associated with the transmission structure corresponding to the time units included in the time range.

Based on Table 4, for another example, a transmission structure that is of the time unit included in the second time and that is indicated by the indication information is:

{a transmission structure 2, a transmission structure 3, and a transmission structure 4}.

In this case, the indicated transmission structure (the transmission structure 2, the transmission structure 3, and the transmission structure 4) may be considered as a subset of (a transmission structure 1, the transmission structure 2, the transmission structure 3, and the transmission structure 4). (The transmission structure 1, the transmission structure 2, the transmission structure 3, and the transmission structure 4) may correspond to the fourth time. A time offset (for example, one time unit) between the first time unit (namely, the time unit corresponding to the transmission structure 2) included in the second time and the first time unit (namely, the time unit corresponding to the transmission structure 1) included in the fourth time may be indicated by using the indication information.

In this embodiment of this disclosure, the indication information used to indicate a slot that is configured by using the RRC signaling and from which the terminal device starts (or) to interpret the transmission structure indicated by the indication information may be another control information different from the indication information. This is not specifically limited.

The foregoing implementation is also effective for the resource of the licensed frequency band. To be specific, by using the implementation of (b), overheads of the RRC signaling may be reduced.

Similarly, regardless of the licensed frequency band or the license-exempt frequency band, in the method provided in this embodiment of this disclosure, the terminal device detects the control information in an unknown state part and/or a downlink state part included in the at least one time unit included in the second time.

It should be noted that the unknown part included in the time unit herein indicates all or some OFDM symbols in an unknown (for example, represented by X in Table 1) state in a time unit. For example, there are M OFDM symbols in an unknown state in one slot, and the terminal device may detect the control information in a time resource range corresponding to at least one of the M OFDM symbols. The downlink state part included in the time unit herein indicates all or some OFDM symbols used for downlink data transmission in a time unit. For example, there are N OFDM symbols in a downlink state in one slot, and the terminal device may detect the control information in a time resource range corresponding to at least one of the N OFDM symbols. M and N are positive integers. The control information herein may be indication information, for example, control information used to indicate a slot transmission structure, or other information. This is not specifically limited.

The advantage of this implementation is that dynamic change of the service may be more flexibly supported, and dynamic adjustment that is of a frame structure and that is caused by the dynamic change may be adapted.

Figure 16A:
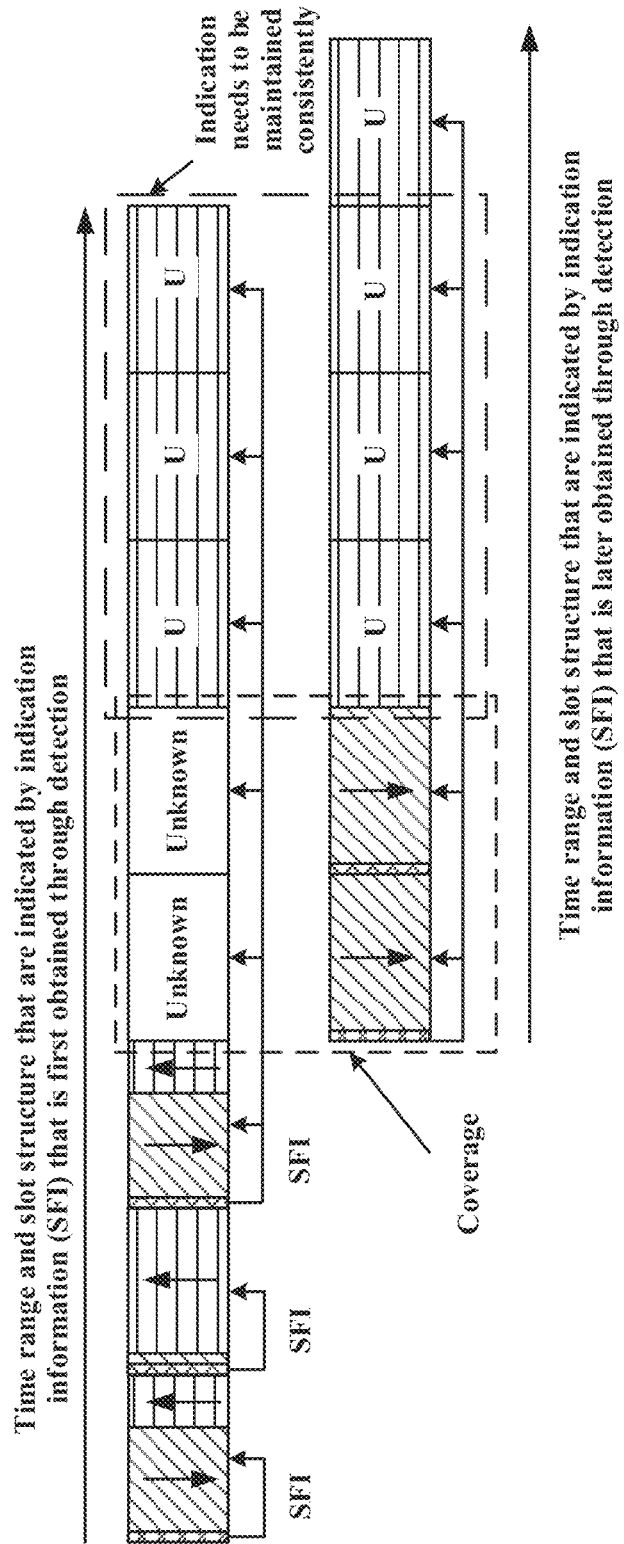
FIG. 16(a) and FIG. 16(b) are schematic diagrams showing that a terminal device obtains new indication information through detection in an unknown part and a downlink part that are of indication information according to an embodiment of this disclosure.
Figure 16B:
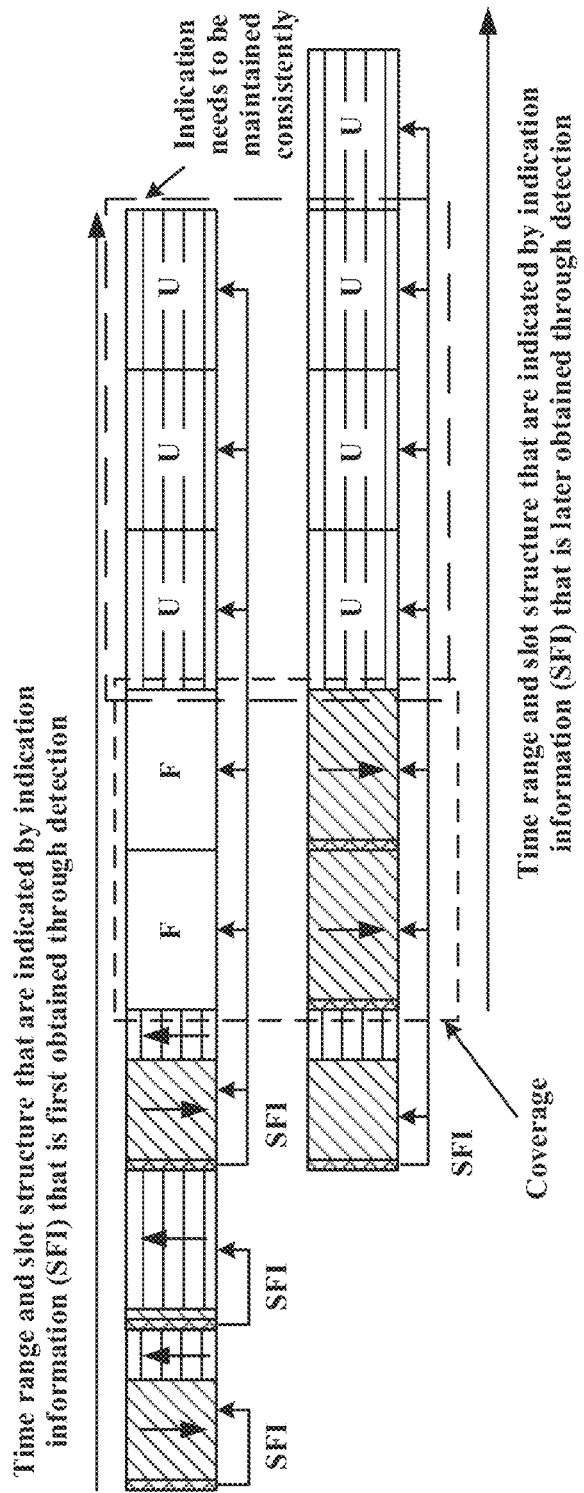

Optionally, for a time unit included in a time range in which the time range indicated by the indication information that is obtained through detection later is overlapped with the time range indicated by the indication information that is first obtained through detection, only a status indicated by the indication information that is first obtained through detection may be overrode by uplink transmission or downlink transmission indicated by the indication information that is obtained through detection later. FIG. 16(a) and FIG. 16(b) are schematic diagrams showing that a terminal device obtains new indication information through detection in an unknown part and a downlink part that are of indication information according to an embodiment of this disclosure.

In the method provided in this embodiment of this disclosure, regardless of the licensed frequency band or the license-exempt frequency band, the terminal device may start to detect the indication information at a boundary of the OFDM symbol included in a time unit. For example, the terminal device detects the indication information at intervals of K time units in one slot, and transmission duration corresponding to the K time units may be the same or may be different. For example, there are 14 OFDM symbols in one slot, and four locations in one slot for detecting the indication information by the terminal device may be pre-configured or predefined, respectively starting from a first OFDM symbol, a fourth OFDM symbol, an eighth OFDM symbol, and an eleventh OFDM symbol. Alternatively, there may be another representation form. This is not specifically limited.

Optionally, an example in which the time unit is one slot is used. In this case, if the terminal device obtains the indication information through detection at a non-slot boundary of one slot, a slot structure of the slot starts from an unknown state. In other words, a transmission structure corresponding to the first OFDM symbol included in at least one of the time units included in the second time is in an unknown state.

When uplink service load is heavy, a main function of sending downlink data by the access network device (or any serving cell) is mainly to notify a frame structure and scheduling uplink data. In this case, if the indication information is still fixed at a slot boundary and sent, the access network device may occupy excessive resources of the license-exempt frequency band to send the downlink data. In the method provided in this embodiment of this disclosure, unnecessary overheads for downlink data transmission may be reduced, and efficiency of data transmission may be ensured.

Figure 17:
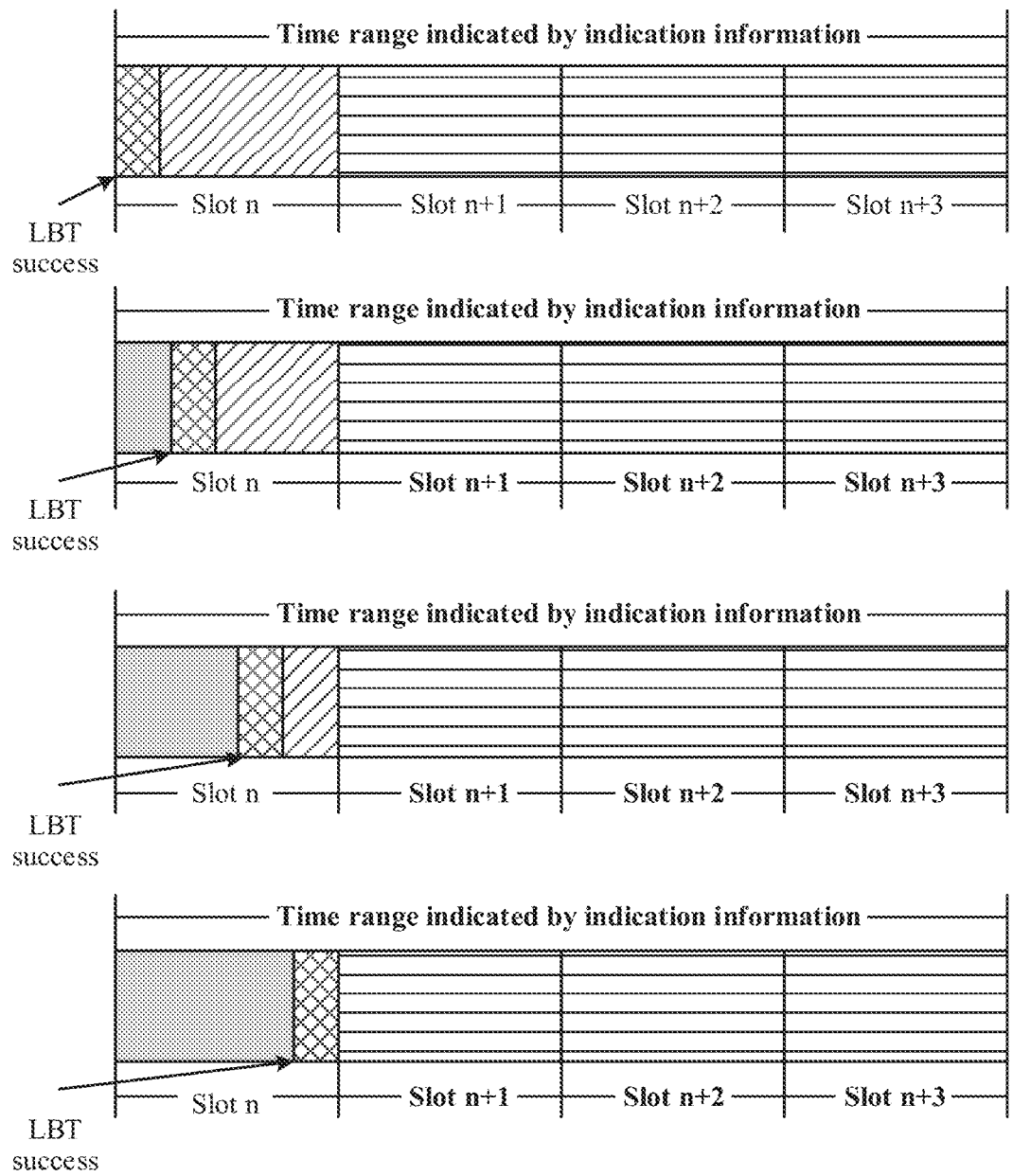
FIG. 17 is a schematic diagram showing that indication information is detected according to an embodiment of this disclosure.

FIG. 17 is a schematic diagram showing that indication information is detected according to an embodiment of this disclosure, and shows that after obtaining a resource through contention in a slot, an access network device may notify, by using an unknown state, a terminal device of the slot from a start boundary of the slot to a start moment at which the resource is obtained through contention. It should be noted that in this embodiment of this disclosure, F (flexible) may also indicate an unknown state (X). Table 5 shows a slot structure corresponding to FIG. 17. It should be noted that in this embodiment of this disclosure, the unknown state may be represented by X, F. or Unknown. This is not specifically limited. [F D U] indicates that a status corresponding to some OFDM symbols in the slot is an unknown state, a status corresponding to some OFDM symbols is used for downlink data transmission, and a status corresponding to some OFDM symbols is used for uplink data transmission.

TABLE 5

|  | Slot n | Slot n + 1 | Slot n + 2 | Slot n + 3 |
| --- | --- | --- | --- | --- |
| Case 1 | [D U] | [U] | [U] | [U] |
| Case 2 | [F D U] | [U] | [U] | [U] |
| Case 3 | [F D U] | [U] | [U] | [U] |
| Case 4 | [F D] | [U] | [U] | [U] |

In conclusion, according to the method provided in this embodiment of this disclosure, the following effects may be implemented on the licensed frequency band and the license-exempt frequency band.

1. A detection period of the indication information is decoupled from the time range indicated by the indication information, and a more flexible sending location of the indication information is more suitable for data transmission of a system on the license-exempt frequency band or a system on the licensed frequency band.

In this embodiment of this disclosure, the indication information may be SFI, but is not limited to the SFI.

2. Transmission reliability is improved.

The indication information may be repeatedly sent within the indicated transmission time range. Correspondingly, a slot structure configuration and interpretation method for repeatedly transmitting the indication information is adapted, so that configuration of a slot structure within the time range indicated by the indication information is simplified, and reliability of data transmission is improved.

3. The indication information sent subsequently may cover the indication information sent previously, to better adapt to dynamic adjustment of transmission time of an uplink/downlink service.

4. A detection granularity of the indication information is relatively fine, thereby supporting faster resource occupation for data transmission.

An example of this disclosure further provides an apparatus (for example, an integrated circuit, a wireless device, or a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include an IC that is of a memory and that is configured to store data and/or an instruction. (iii) an RFIC such as an RF receiver or an RF transmitter/receiver, (iv) an ASIC such as a mobile station modem, (v) a module that can be embedded in another device, (vi) a receiver, a cellular phone, a wireless device, a handheld phone, or a mobile unit, and (vii) the like.

The method and apparatus that are provided in the embodiments of this disclosure may be applied to the terminal device or the access network device (which may be collectively referred to as a wireless device). The terminal device, the access network device, or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, in this embodiment of this disclosure, a specific structure of an execution body of the method is not limited in this embodiment of this disclosure, provided that a program that records code of the method in this embodiment of this disclosure can be run to perform communication according to a signal transmission method in this embodiment of this disclosure. For example, the wireless communication method in the embodiments of this disclosure may be performed by the terminal device or the access network device, or may be performed by a function module that is in the terminal device or the access network device and that can invoke and execute a program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this disclosure.

In addition, aspects or features in the embodiments of this disclosure may be implemented as a method, an apparatus or a product that uses standard programming and/or engineering technologies. The term "product" used in this disclosure covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), and a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When the software is used to implement the embodiments, the embodiments may be implemented partially in a form of a computer program product. The computer program product includes one or more computer instructions. When the computer program instructions are loaded and executed on the computer, the procedure or functions according to the embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this disclosure. The execution sequences of the processes should be determined based on functions and internal logic of the processes, but should not be construed as any limitation on the implementation processes of the embodiments of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When functions are implemented in the form of a software functional unit and sold or used as an independent product, the functions may be stored in a computer-readable storage medium. Based on such an understanding, the technical solutions of the embodiments of this disclosure essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of this disclosure, but are not intended to limit the protection scope of the embodiments of this disclosure. Any variation or replacement readily figured out by a person skilled in the art within the technical scope disclosed in the embodiments of this disclosure shall fall within the protection scope of the embodiments of this disclosure.

What is claimed is:

1. A device, comprising:
a processor; and
a non-transitory computer-readable storage medium coupled to the processor and storing programming instructions for being executed by the processor, the programming instructions, when executed by the processor, cause the device to:
receive configuration information sent by an access network side communications apparatus, wherein the configuration information comprises identification information of at least one cell; and
detect first indication information sent by the access network side communications apparatus by using a length of a first time as a granularity, wherein the first indication information indicates a transmission structure corresponding to one or more time units included in a second time of the at least one cell identified by the identification information, the length of the first time is different from a length of the second time, and the length of the first time is less than a duration of one slot.

2. The device according to claim 1, wherein the first indication information sent by the access network side communications apparatus by using the length of the first time as the granularity is detected based on a determination that the at least one cell does not obtain a resource of a license-exempt frequency band through contention.

3. The device according to claim 1, wherein the device is further caused to:
detect second indication information sent by the access network side communications apparatus within the second time by using a length of a third time as the granularity, wherein the second indication information is used to indicate a transmission structure corresponding to one or more time units included in a fourth time of the at least one cell identified by the identification information, and the fourth time is overlapping or outside of a range included in the second time.

4. The device according to claim 1, wherein the device is further caused to:
receive configuration information that is of the transmission structure and that is sent by the access network side communications apparatus, wherein the configuration information of the transmission structure comprises M time units and a transmission structure corresponding to each time unit of the M time units, and the first indication information comprises an indication of an $i^{th}$ time unit in the M time units; and
determine the transmission structure corresponding to the one or more time units included in the second time, based on the configuration information of the transmission structure and the indication that is of the $i^{th}$ time unit and that is included in the first indication information, wherein the second time comprises (M−i+1) time units, and a transmission structure corresponding to a $j^{th}$ time unit in the (M−i+1) time units is a transmission structure corresponding to an $(i+j−1)^{th}$ time unit in the M time units included in the configuration information of the transmission structure, wherein $1 \leq i \leq M$, $1 \leq j \leq M-i+1$, and i and j are natural numbers.

5. The device according to claim 1, wherein the control information sent by the access network side communications apparatus and the control information is control information common to at least one of a cell or control information specific to the terminal side communications apparatus, in at least one of an unknown state part or a downlink state part of the at least one time unit included in the second time.

6. The device according to claim 1, wherein a transmission structure corresponding to a first orthogonal frequency division multiplexing symbol included in the at least one of one or more time units included in the second time of the at least one cell is in an unknown state.

7. A device, comprising:
a processor; and
a non-transitory computer-readable storage medium coupled to the processor and storing programming instructions for being executed by the processor, the programming instructions, when executed by the processor, cause the device to:

send configuration information to a terminal side communications apparatus, wherein the configuration information comprises identification information of at least one cell; and send first indication information to the terminal side communications apparatus, wherein the first indication information is used to indicate a transmission structure corresponding to one or more time units included in a first time of the at least one cell identified by the identification information, and wherein a length of a time unit in which the first indication information is located is less than a duration of one slot.

8. The device according to claim 7, wherein the first time comprises at least one of at least one time unit in which a result of a clear channel assessment is idle, or at least one time unit associated with a channel listening mechanism without random backoff.

9. The device according to claim 7, wherein the device is further caused to:

send second indication information within the first time by using a length of a second time as the granularity, wherein the second indication information is used to indicate a transmission structure corresponding to one or more time units included in a third time of the at least one cell identified by the identification information, and the third time overlapping or outside of a range included in the first time.

10. The device according to claim 7, wherein the device is further caused to:

send configuration information of the transmission structure to the terminal side communications apparatus, wherein the configuration information of the transmission structure comprises M time units and a transmission structure corresponding to each time unit of the M time units, the first indication information comprises an indication of an $i^{th}$ time unit in the M time units, and the first time comprises (M−i+1) time units, a transmission structure corresponding to a $j^{th}$ time unit in the (M−i+1) time units is a transmission structure corresponding to an $(i+j-1)^{th}$ time unit in the M time units included in the configuration information of the transmission structure, wherein 1≤i≤M, 1≤j≤M−i+1, and i and j are natural numbers.

11. The device according to claim 7, wherein the device is further caused to:

send control information to the terminal side communications apparatus in at least one of an unknown state part or a downlink state part of the at least one time unit included in the first time, and the control information is control information common to at least one of a cell or control information specific to the terminal side communications apparatus.

12. The device according to claim 7, wherein a transmission structure corresponding to a first orthogonal frequency division multiplexing symbol included in the at least one of one or more time units included in the first time of the at least one cell is in an unknown state.

13. A device, comprising:
a processor; and
a non-transitory computer-readable storage medium coupled to the processor and storing programming instructions for being executed by the processor, the programming instructions, when executed by the processor, cause the device to:

send configuration information to a terminal side communications apparatus, wherein the configuration information comprises identification information of at least one cell; and send first indication information to the terminal side communications apparatus by using a length of a first time as a granularity, wherein the first indication information is used to indicate a transmission structure corresponding to one or more time units included in a second time of the at least one cell identified by the identification information, the length of the first time is different from a length of the second time, and the length of the first time is less than a duration of one slot.

14. The device according to claim 13, wherein the programming instructions further instruct the processor to:

send second indication information within the second time by using a length of a third time as the granularity, wherein the second indication information is used to indicate a transmission structure corresponding to one or more time units included in a fourth time of the at least one cell identified by the identification information, and the fourth time is overlapping or outside of a range included in the second time.

15. The device according to claim 13, wherein the device is further caused to:

send configuration information of the transmission structure to the terminal side communications apparatus, wherein the configuration information of the transmission structure comprises M time units and a transmission structure corresponding to each time unit of the M time units, the first indication information comprises an indication of an $i^{th}$ time unit in the M time units, and the second time comprises (M−i+1) time units, a transmission structure corresponding to a $j^{th}$ time unit in the (M−i+1) time units is a transmission structure corresponding to an $(i+j-1)^{th}$ time unit in the M time units included in the configuration information of the transmission structure, wherein 1≤i≤M, 1≤j≤M−i+1, and i and j are natural numbers.

16. The device according to claim 13, wherein the device is further caused to:

send control information in at least one of an unknown state part or a downlink state part of the at least one time unit included in the second time, and the control information is control information common to at least one of a cell or control information specific to the terminal side communications apparatus.

17. The device according to claim 13, wherein a transmission structure corresponding to a first orthogonal frequency division multiplexing symbol included in the at least one of one or more time units included in the second time of the at least one cell is in an unknown state.

* * * * *